United States Patent
Hashim

(10) Patent No.: US 8,463,624 B2
(45) Date of Patent: Jun. 11, 2013

(54) TECHNIQUES FOR ENSURING DATA SECURITY AMONG PARTICIPANTS IN A WEB-CENTRIC INSURANCE MANAGEMENT SYSTEM

(75) Inventor: Safaa H. Hashim, Antioch, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2075 days.

(21) Appl. No.: 10/669,882

(22) Filed: Sep. 23, 2003

(65) Prior Publication Data

US 2009/0083076 A1 Mar. 26, 2009

Related U.S. Application Data

(60) Provisional application No. 60/504,539, filed on Sep. 19, 2003.

(51) Int. Cl.
*G06Q 40/00* (2012.01)
(52) U.S. Cl.
USPC ............................................................. 705/4
(58) Field of Classification Search
USPC ...... 705/2, 3, 4, 37, 38, 35, 1, 8, 64; 709/203, 709/217, 223, 246, 250, 201, 226, 238, 239, 709/249; 380/282; 726/1, 4, 8
See application file for complete search history.

(56) References Cited

U.S. PATENT DOCUMENTS

| | | | |
|---|---|---|---|
| 5,191,522 A | 3/1993 | Bosco et al. | |
| 5,867,665 A * | 2/1999 | Butman et al. | 709/239 |
| 6,618,851 B1 | 9/2003 | Zundel et al. | |
| 6,907,546 B1 | 6/2005 | Haswell et al. | |
| 7,080,020 B1 * | 7/2006 | Klaus | 705/4 |
| 7,167,705 B2 | 1/2007 | Maes | |
| 7,181,017 B1 * | 2/2007 | Nagel et al. | 380/282 |
| 7,240,017 B2 * | 7/2007 | Labelle et al. | 705/4 |
| 7,249,038 B2 * | 7/2007 | Luedtke | 705/4 |
| 7,333,939 B1 * | 2/2008 | Stender et al. | 705/4 |
| 7,389,246 B1 * | 6/2008 | Ohrt | 705/4 |
| 7,406,427 B1 | 7/2008 | Guyan et al. | |
| 2001/0030644 A1 | 10/2001 | Allport | |
| 2001/0037223 A1 * | 11/2001 | Beery et al. | 705/4 |
| 2002/0002475 A1 | 1/2002 | Freedman et al. | |

(Continued)

FOREIGN PATENT DOCUMENTS

WO WO0225470 A1 * 3/2002

OTHER PUBLICATIONS

ZebuInc.com web pages from Dec. 2000, saved as ZeBU SelectTech. 20 pages. [Retrieved from Internet Jul. 1, 2008]. URL: <http://web.archive.org/web/*re__/http://www.zebuinc.com>.*

(Continued)

*Primary Examiner* — Lena Najarian
*Assistant Examiner* — Natalie A Pass
(74) *Attorney, Agent, or Firm* — Kilpatrick Townsend & Stockton LLP

(57) ABSTRACT

A scalable, adaptable, modular, and web-centric Insurance Back-Office System (IBOS) for serving the needs of carriers, agencies, agents, and service providers in the insurance industry is disclosed. The IBOS provides a framework for allowing web-centric collaboration among agents, agencies, carriers, and service providers, using applications that manage applicants, cases, and policies in an efficient and secure manner. The IBOS infrastructure is designed to facilitate the creation of a new application, module, tool, or view in a simplified manner.

31 Claims, 23 Drawing Sheets

U.S. PATENT DOCUMENTS

| | | | |
|---|---|---|---|
| 2002/0010679 A1* | 1/2002 | Felsher | 705/51 |
| 2002/0032583 A1 | 3/2002 | Joao | |
| 2002/0032626 A1* | 3/2002 | DeWolf et al. | 705/35 |
| 2002/0040312 A1* | 4/2002 | Dhar et al. | 705/8 |
| 2002/0046064 A1 | 4/2002 | Maury et al. | |
| 2002/0059137 A1* | 5/2002 | Freeman et al. | 705/38 |
| 2002/0065758 A1* | 5/2002 | Henley | 705/37 |
| 2002/0116231 A1* | 8/2002 | Hele et al. | 705/4 |
| 2002/0120776 A1* | 8/2002 | Eggebraaten et al. | 709/246 |
| 2002/0138306 A1* | 9/2002 | Sabovich | 705/3 |
| 2002/0188484 A1 | 12/2002 | Grover et al. | |
| 2002/0198743 A1 | 12/2002 | Ariathurai et al. | |
| 2003/0065614 A1* | 4/2003 | Sweeney | 705/38 |
| 2003/0078816 A1* | 4/2003 | Filep | 705/4 |
| 2003/0093302 A1* | 5/2003 | Quido et al. | 705/4 |
| 2003/0144949 A1 | 7/2003 | Blanch | |
| 2003/0154403 A1* | 8/2003 | Keinsley et al. | 713/201 |
| 2003/0182463 A1 | 9/2003 | Valk | |
| 2003/0195776 A1 | 10/2003 | Moore et al. | |
| 2003/0195838 A1* | 10/2003 | Henley | 705/37 |
| 2003/0204421 A1* | 10/2003 | Houle et al. | 705/4 |
| 2003/0233260 A1* | 12/2003 | Snell et al. | 705/4 |
| 2004/0186750 A1 | 9/2004 | Surbey et al. | |
| 2004/0225596 A1 | 11/2004 | Kemper et al. | |
| 2005/0055250 A1* | 3/2005 | Kopold et al. | 705/4 |
| 2009/0083077 A1 | 3/2009 | Hashim | |

OTHER PUBLICATIONS

ZeBulletin, Apr. 2001. 6 pages. [Retrieved from Internet Jul. 1, 2008]. URL: <http://web.archive.org/web/*re_/http://www.zebuinc.com>.*

ZeBulletin, Nov. 2000. 4 pages. [Retrieved from Internet Jul. 1, 2008]. URL: <http://web.archive.org/web/*re_/http://www.zebuinc.com>.*

U.S. Appl. No. 10/669,885, filed Sep. 23, 2003, Hashim.
U.S. Appl. No. 10/670,995, filed Sep. 23, 2003, Hashim.
"First Alliance provides an electronic portal for brokers," *Origination News*, 9(2): 48, abstract, (1999).
"Xpede Revolutionizes the Online Lending Process, Puts Lenders on Fast Track to Deliver Internet-Based Loans," *PR Newswire*, Sep. 28, 1999, 3 pages.
Non Final Office Action mailed Apr. 29, 2008 in related U.S. Appl. No. 10/670,180.
Final Office Action mailed Sep. 18, 2008 in related U.S. Appl. No. 10/669,885.
Final Office Action mailed Jul. 10, 2008 in related U.S. Appl. No. 10/670,995.
Non Final Office Action mailed Sep. 20, 2007 in related U.S. Appl. No. 10/670,995.
Non Final Office Action mailed Jan. 9, 2008 in related U.S. Appl. No. 10/669,885.
Non-Final Office action mailed on Jan. 30, 2009 in related U.S. Appl. No. 10/670,995.
Final Office Action mailed Mar. 4, 2009 in related U.S. Appl. No. 10/670,180.
ZeBU web pages, Aug. 2002 and Dec. 2001.
Zebu -S-1/A Apr. 12, 2000 selected pages.
Advisory Action, mail date May 7, 2009; U.S. Appl. No. 10/670,180.
Office Action, mail date Aug. 20, 2009, U.S. Appl. No. 10/670,180.
Office Action, mail date Oct. 5, 2009, U.S. Appl. No. 10/669,885.
Final Office Action, mail date Aug. 18, 2009, U.S. Appl. No. 10/670,995.

* cited by examiner

FIG. 10

| Agencies Summary - Microsoft Internet Explorer |
| --- |

Back ▽ ⊗ ⊠ ☐ ⊛ 🔍Search ☆Favorites ○ ☐▽ ⊛ ☐▽☐
Address: https://mgm t05:99443/idt/POLICY_SUMMARY.do?VIEW=CARRIER ▽ i DESKTOP 1004  1006  1008  1012  1014  1016
Action | Tools | Help    Agencies | Carriers | Policies | Follow-up
              1010
1002          1018           QuickView Agency
All Agencies ▽

| Agency | InsType | Status | Total Cases | Updated Cases | Total premium | Total Face Amount |
| --- | --- | --- | --- | --- | --- | --- |
| ⌂ FINANCIAL BROKERAGE, INC | | | | | | |
| | Term | | 409 | 0 | 225,965.55 | 172,106,600.00 |
| | Universal Life | | 398 | 0 | 234,521.97 | 169,261,000.00 |
| | | Submitted | 11 | 0 | 21,396.583 | 21,875,000.00 |
| | | Not Taken | 113 | 0 | 3,423.92 | 172,106,600.00 |
| | | Placed/Paid | 113 | 0 | 225,965.55 | 169,261,000.00 |
| | | Postponed | 1 | 0 | 234,521.97 | 21,875,000.00 |
| | | Withdraw/Incomplete | 1 | 0 | 21,396.583 | 172,106,600.00 |
| | | Issued | 1 | 0 | 3,423.92 | 169,261,000.00 |
| ⌂ Financial Brokerage, Inc 0314 | | | 609 | 0 | 225,965.55 | 21,875,000.00 |
| | Term | | 553 | 0 | 234,521.97 | 172,106,600.00 |
| | | Inforce | 216 | 0 | 21,396.583 | 169,261,000.00 |
| | | Pending | 101 | 0 | 3,423.92 | 21,875,000.00 |
| | | Issued | 115 | 0 | 21,396.583 | 21,875,000.00 |
| | | Withdrawn | 18 | 0 | 3,423.92 | 172,106,600.00 |
| | | Incomplete | 19 | 0 | 225,965.55 | 169,261,000.00 |
| | | Declined | 38 | 0 | 234,521.97 | 21,875,000.00 |
| | | Not Taken | 14 | 0 | 21,396.583 | 172,106,600.00 |
| | | Submitted | 14 | 0 | 3,423.92 | 169,261,000.00 |
| | | Approved | 13 | 0 | 234,521.97 | 21,875,000.00 |
| | | Positioned | 5 | 0 | 21,396.583 | 21,875,000.00 |
| | Universal Life | | 50 | 0 | 3,423.92 | 21,875,000.00 |
| | | Inforce | 21 | 0 | 3,423.92 | 172,106,600.00 |
| | | Declined | 2 | 0 | 234,521.97 | 169,261,000.00 |

Agent Name
[        ]

Agent Code
[        ]

Insured Name
[        ]

Policy Number
[        ]

From M/D/Y
[        ]

To M/D/Y
[        ]

Policy Type Code
All Codes ▽

Policy Status Code
All Codes ▽

[Reset] [Search]

USER: VANN THOMAS WESSON ....
Menu ready for use

FIG. 11

| Carriers Summary - Microsoft Internet Explorer |
|---|
| ⬅ Back ▽ ⊙  ☒ ⊡ ⌂ 🔍 Search ☆ Favorites ⊙ \| ⬚▽ 🖨 ☐▽☐ |
| Address: https://mgm tO5:99443/idt/POLICY_SUMMARY.do?VIEW=AGENCY ▽ | i DESKTOP

| Action | Tools | Help |                    | Agencies | Carriers | Policies | Follow-up |

QuickView

Carrier
[All Carriers ▽]

Agent Name
[          ]

Agent Code
[          ]

Insured Name
[          ]

Policy Number
[          ]

From M/D/Y
[          ]

To M/D/Y
[          ]

Policy Type Code
[All Codes ▽]

Policy Status Code
[All Codes ▽]

[Reset] [Search]

| Carrier | InsType | Status | Total Cases | Updated Cases | Total premium | Total Face Amount |
|---|---|---|---|---|---|---|
| 📁 Companion Life | | | 434 | 0 | 2,107,747.87 | 172,106,600.00 |
| 📂 First Colony Life Insurance | | | 33716 | 0 | 17,716,605.00 | 169,261,000.00 |
| 📁 Interest Sensitive | | | 77 | 0 | 21,396.583 | 21,875,000.00 |
| 📁 Normal | | | 11762 | 0 | 3,423.92 | 172,106,600.00 |
| 📁 Pension | | | 27 | 0 | 225,965.55 | 169,261,000.00 |
| 📁 Term | | | 19920 | 0 | 234,521.97 | 21,875,000.00 |
| 📁 Universal Life | | | 1940 | 0 | 21,396.583 | 172,106,600.00 |
| 📂 GE Capitol | | | 908 | 0 | 3,423.92 | 169,261,000.00 |
| 📁 Normal | | | 77 | 0 | 225,965.55 | 21,875,000.00 |
| 📁 Term | | | 749 | 0 | 234,521.97 | 172,106,600.00 |
| 📁 Universal Life | | | 37 | 0 | 21,396.583 | 169,261,000.00 |
| 📂 United of Omaha | | | 6995 | 0 | 3,423.92 | 21,875,000.00 |
| 📁 Normal | | | 507 | 0 | 21,396.583 | 21,875,000.00 |
| 📁 Term | | | 4176 | 0 | 3,423.92 | 172,106,600.00 |
| 📂 Universal Life | | | 2107 | 0 | 225,965.55 | 169,261,000.00 |
| 📄 Pending | | | 1167 | 0 | 234,521.97 | 21,875,000.00 |
| 📄 Issued/Approved | | | 249 | 0 | 21,396.583 | 172,106,600.00 |
| 📄 Placed/Paid | | | 223 | 0 | 3,423.92 | 169,261,000.00 |
| 📄 Declined | | | 92 | 0 | 234,521.97 | 21,875,000.00 |
| 📄 Withdrawn/Incomplete | | | 107 | 0 | 21,396.583 | 21,875,000.00 |
| 📄 Not Taken | | | 32 | 0 | 3,423.92 | 21,875,000.00 |
| 📄 Deleted | | | 21 | 0 | 3,423.92 | 172,106,600.00 |
| 📂 Whole Life | | | 205 | 0 | 234,521.97 | 169,261,000.00 |

USER: VANN THOMAS WESSON . . . .
Menu ready for use

FIG. 12

| | | | |
|---|---|---|---|
| Policies - Microsoft Internet Explorer | | | |

Back ▽ ⊗  ⊠ ⊡ ⊚ ⌕ Search ☆ Favorites ○ | ⊜ ▽ ⊕ □ ▽ □
Address: https://mgm tO5:99443/idt/POLICY_SUMMARY.do  ▽ i DESKTOP

| Agencies | Carriers | Policies | Follow-up |
|---|---|---|---|

Action | Tools | Help

QuickView

1202 — 1204

Carrier
[First Colony Li ▽]

Agent Name
[          ]

Agent Code
[          ]

Insured Name
[          ]

Policy Number
[          ]

From M/D/Y
[          ]

To M/D/Y
[          ]

Policy Type Code
[Term ▽]

Policy Status Code
[All Codes ▽]

[Reset] [Search]

Page Size [5 ▽]  Found: 19920 items  ⟪ □ ▷ ⟫  (Remember this Search) —— 1206

| | Policy # | Insured ID | Agent Name | Premium | Face Amount |
|---|---|---|---|---|---|
| ☐ | 0001849102 | Turk, Paula Ann | Unknown | 1112.59 | 350,000.00 |
| ☐ | 1313012 | Martinelli Robert<br>Martinelli, Gina<br>Martinelli, Jr. Robert | 0101 | | 100,000.00 |
| ☐ | 1672530 | Descamps, Cyril M | National Benefit Corporation | 261.00 | 350,000.00 |
| ☐ | 1787978 | Vineberg, Allan | J B Hanauer Agency Inc. 0101 0101 | 282.50 | 150,000.00 |
| ☐ | 1816253 | Kashmanian, Ronald | 0101 | 279.31 | 250,000.00 |

USER: VANN THOMAS WESSON . . . .
Menu ready for use

FIG. 13

```
Policies - Microsoft Internet Explorer
Back ▽ ⊙  ☒ ▣ ⌂ ⌕ Search ★ Favorites ⊙ | ▣▽ ⌘ □▽□
Address: https://mgm tO5:99443/idt/POLICIES.do                    ▽
``` i DESKTOP

| Action | Tools | Help |    Agencies | Carriers | Policies | Follow-up

QuickView

Carrier      Page Size [20 ▽] Found: 19920 items ⏮ ◻ ▶ ⏭    (Remember this Search)
[First Colony Li ▽]

Agent Name     ✓ Policy #   Insured ID   Agent Name   Premium   Face Amount
[          ]

Agent Code     ☐ 8166147   DODD, Diana   Center Link Insurance
[          ]                Lynn           & Financial Services
                                               Barry Wolf Insured Name                            0101, Private
[          ]                                Ledger Insurance 0101

Policy Number                          Robert Karras, 0101
[          ]
                 ☐ 6754648   Johnsen, Mark R.   American From M/D/Y                                Express 0101
[          ]                                Diversified To M/D/Y                                     Brokerage Services
[          ]                                D.E. Swink 0101

Policy Type Code    ☐ 6754294   Chapman, Paul   American
[Term ▽]                                 Express 0101

Policy Status Code                        Diversified
[All Codes ▽]                           Brokerage Services
                                              Louis Basil 0101

[Reset] [Search]   ☐ 8102006   Huth, John W.   American
                                            Express 0101
                                            George Van
                                            Deusen 0101
                                            Diversified
                                            Brokerage Services
                                            Carl W. Heick 1901
                                           0101

👤    👁    ID·X    📖    ⌂

USER: VANN THOMAS WESSON . . . .
Menu ready for use

FIG. 14

```
Policy Details - Microsoft Internet Explorer
Back ▽ ⊗  ☒ ▤ ⚙  ⌕ Search  ☆ Favorites  ○ | ◉ ▽  ⚙  □ ▽ □
Address:  https://mgmt05:99443/idt/POLICIES.do                        ▽
``` i DESKTOP

| Agencies | Carriers | Policies | Details | Follow-up |

Action | Tools | Help

QuickView

☐ Add to Selected

POLICY  8168147

| | |
|---|---|
| Company: | First Colony LIfe Insurance |
| Policy Number: | 816647 |
| Last Update: | 04/21/2003 |
| Status Date: | 04/21/2003 |
| Plan: | L14T |
| Policy Date: | 04/21/2003 |
| Issue Date: | 04/21/2003 |
| Received Date: | 3/11/2003 |
| Rating: | PREF BEST |
| Face Amount: | 250,000.00 |
| Approved Date: | 04/21/2003 |
| Policy Status: | Pending |
| Group No.: | |
| Placement Exp. Date: | 06/21/2003 |
| Underwriter: | CPEBBLES |
| Application Type: | Term |
| Issue State: | OH |
| Qualified Plan Type: | |
| Smoker State: | |
| Issue Age: | |
| Issure Gender: | |
| Message: | App Reviewed Mike Smith . . . . |
| GA Number: | |

Case:
Application
Insured(s)
Agents(s)
Requirement(s)
Coverage
Coverage Option(s)
Premium
New Follow-up

↳ 1402

USER:  VANN THOMAS WESSON . . . .
Done

FIG. 15

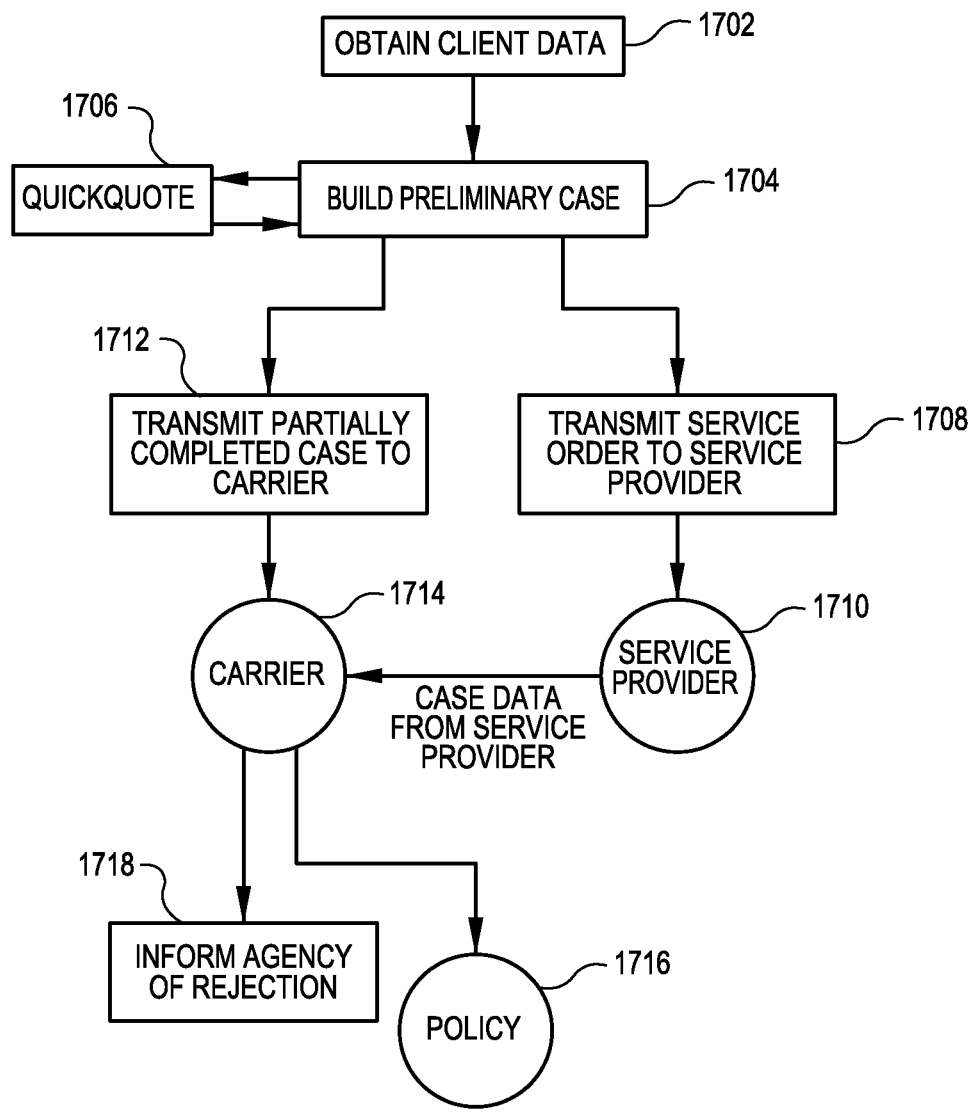

FIG. 20

```
Client Details -Mary F. Tyler-Microsoft Internet Explorer
⊙Back ▽ ⊙  ☒ ⊡ ⊛ ⌕ Search ★Favorites ○ | ⊗ ▽  ⇱ □ ▽ □
Address: https://mgm t05:99443/idt/CLIENTS.do                    ▽
``` i DESKTOP

2004 — Action | Tools | Help
        ▨                        Client Summary | Clients | Client Details | Client Follow-up
                                                                    QuickCase
        ☐ Add to Selected
2006 — CLIENT: Mary F. Tyler         Prefix    [Mrs.       ▽]
                                  First Name  [Mary                ]
2008 —  Client Profile            Middle Name [Frances             ]
        New Address               Last Name   [Tyler               ]
        New Phone                 Suffix      [Select a suffix  ▽]
        New E-mail                DOB (M/D/Y) [09/23/1959          ]
        New Follow-up             SSN         [231] [34] [5678]
        Case(s)                   Ref. No.    [123456              ]
                                  Gender      [Female     ▽]                  — 2002
                                  US Citizen? [✓]  Citizenship (if not) [Select Country ▽]
                                  Visa type   [Select Country ▽]
                                  Visa Number [                    ]
                                  Best time to call [              ]

[Reset] [Update] [Delete]

○         ID·X
        ▯    ⌒    ⟨⟩    ⎕
USER:  VANN THOMAS WESSON . . . .
Menu ready for use

FIG. 22

```
Clients - Microsoft Internet Explorer
⊖ Back ▽ ⊙  ☒ ▣ ⚙ ⌕ Search ☆ Favorites ○ | ◈ ▽ ⊟  □ ▽ □
Address: https://mgm tO5:99443/idt/CLIENT_FOLLOWUPS.do          ▽
``` i DESKTOP

| Action | Tools | Help |    Client Summary | Clients | Client Details | Client Follow-up QuickCase Quick Follow-up Search:     Page Size [5 ▽]  Found: 1 items
[Pick an option ▽]
[Search]                    ✓  First Name  Last Name  SSN         City     State  DOB        Gender
Follow-up Search by            ☐ Tim        Chen       456-32-1234  SanFran  CA     7/30/1987  Male
Criteria:                        ⎣2206                         2202
                              2204

Closed Status:
[Any status ▽]
Due Date From:
[           ]
Due Date To:
[           ]  ⎫ 2208
Closed From:
[           ]
Closed To:
[           ]

[Reset] [Search]

USER:  VANN THOMAS WESSON . . . .
Menu ready for use

FIG. 27

Cases - Microsoft Internet Explorer
Back / Search / Favorites
Address: https://mgm tO5:99443/idt/CASE_FOLLOWUPS.do i DESKTOP

Action | Tools | Help

Client Summary | Clients | Client Details | Client Follow-up

QuickCase

Quick Follow-up Search:
Pick an option
Search — 2706

Page Size 5  Found: 3 items

| Client | Ref. No. | Insurance Co. | Agency |
|---|---|---|---|
| ☐ John A. Doe | 333 | AIG Life | Ash Brokerage |
| ☐ Tim A. Chen | 681 | AIG Life | Ash Brokerage |
| ☐ Howard A Hughes | 608 | American Agency Life | Ash Brokerage |

2704   2702

Follow-up Search by Criteria:

Closed Status:
Any status

Due Date From:

Due Date To:

2708

Closed From:

Closed To:

Reset | Search

2700

USER: VANN THOMAS WESSON . . . .
Menu ready for use

TECHNIQUES FOR ENSURING DATA SECURITY AMONG PARTICIPANTS IN A WEB-CENTRIC INSURANCE MANAGEMENT SYSTEM

This application claims priority from a provisional patent application Ser. No. 60/504,539, entitled "Insurance Management Systems and Methods Therefore", by inventor Safaa Hashim, filed Sep. 19, 2003, which is incorporated by reference.

BACKGROUND OF THE INVENTION

Insurance is a complex field. The underwriting of an insurance contract between an applicant and an insurance carrier often involves a plurality of participants, each of whom plays a well-defined role in the complex underwriting process. To facilitate discussion, FIG. 1 depicts in a simplified diagram the various participants involved in a typical insurance sales and underwriting process. In FIG. 1 and the figures herein, a life insurance contract for a natural person is employed as an example. However, the information disclosed herein applies equally well to other types of insurance contract and/or to other types of insurance customer, i.e., irrespective whether the customer is a natural person or a legal or physical entity such as a corporation, a building, etc.

In the life insurance industry alone, for example, there are currently between 200,000 and 250,000 licensed agents. These agents, shown as agents 102, 104, and 106 in FIG. 1, perform many customer interface functions. For example, agents may prospect for potential customers, provide information to potential customers about various insurance products, and interact with the customers to initiate the underwriting process once the customers decide on one or more insurance products.

During the underwriting process, an agent may work with his customer, now an applicant, to obtain necessary information and/or biological specimens, and may answer any questions that the applicant may have about the proposed insurance contract and/or the underwriting process. After the insurance contract is approved by the carrier and executed by the applicant, it becomes a policy in force, and the applicant, now the insured, may continue to interact with the agent to update his personal information from time to time, to make a claim against the policy, and/or to obtain any further information about the insurance policy and/or any other insurance offerings.

Generally speaking, an agent may work for or through one or more agencies. Some agents may work for a single insurance agency (such as in the case of agents 102 and 104 with respect to an agency 108). These exclusive relationships between agents 102 and 104 with respect to agency 108 are indicated by reference numbers 114 and 116 respectively. Other agents may work for multiple agencies, such as in the case of an agent 106 with respect to agencies 108, 110, and 112. These relationships between agent 106 and agencies 108, 110, and 112 are enumerated by reference numbers 118, 120, and 122, respectively. An agent may chose to work with multiple agencies to broaden his product offerings since an agency typically represents only a limited number of insurance carriers.

During the insurance underwriting process, agencies may rely on third-party service providers (124, 126 and 128 in FIG. 1) to perform various tasks, such as to obtain a health history of an applicant, and to obtain blood pressure readings, blood samples and/or any other metrics required to evaluate the insurance contract proposed. In the United States, the market for service providers is dominated by about two dozen large service providers. Generally speaking, the orders for such service come primarily from the agencies although some may come from the insurance carriers. Examples of these relationships are shown by reference numbers 140, 142, 144, and 146. As before, an agency may work with as many service providers as necessary to fulfill the requirements of an insurance contract and/or to fulfill its obligations to the insurance carrier interested in insuring the applicant. Similarly, insurance carriers can work with as many service providers as desired.

Insurance companies or insurance carriers 150, 152, and 154 represent the entities that evaluate a proposed insurance contract in view of the information gathered by the agent, his agency, and/or one or more service providers, and to decide on an applicable rate and/or insurance policy limit. There are hundreds of insurance carriers offering life insurance products in the United States. Insurance carriers have relationships (160, 162, 164, 166, 168, and 170) with service providers (e.g. 124, 126, and 128), since it is customary (but not absolutely required) that insurance carriers pay for the services furnished by the service providers irrespective whether the service orders originated from the agencies (e.g., 108, 110, or 112) or from the insurance carriers.

Generally speaking, insurance carriers work with agents through agencies. Accordingly, an insurance carrier generally has a contract with one or more insurance agencies, which contract governs the relationship between the insurance carrier and the insurance agency(ies). These contractual relationships are enumerated in FIG. 1 by reference numbers 180, 182, 184, and 186. The contract may include terms such as the insurance products an agency may sell, its geographical territory, the commissions payable to the agency for a successfully sold insurance policy, and the like. Although insurance carriers rarely work directly with agents, it is customary that an insurance carrier notify a state's insurance department of the appointment of an agent, in effect informing the state's regulatory agency about the agents representing its product lines before the public in that state.

From a contractual standpoint, the participants depicted in FIG. 1 deal with one another at arms length. In practical terms, many of these participants in the insurance underwriting process work with other participants in endless permutations. As will be discussed in connection with FIG. 2, this fact currently contributes to a huge amount of wasted and/or duplicate effort and inefficiency in the insurance underwriting and management process.

FIG. 2 shows in a simplified diagram a typical insurance underwriting cycle. The cycle starts with a customer 202 contacting an agent 204 to request information about insurance. Agent 204 may have identified customer 202 through his contacts or via his prospecting program, or customer 202 may have been referred to agent 204 by an agency and/or an insurance carrier. During this pre-sale period, agent 204 typically provides insurance information to customer 202, answers any questions that may specifically apply to customer 202, and/or clarifies any information to entice customer 202 to apply for insurance. Since agent 204 earns a commission on each successfully completed insurance policy, agent 204 typically has a vested interest in getting customer 202 to fill out an application and in following up with other participants in the underwriting process to ensure that the application timely matures into a valid insurance policy.

If the insurance product offered is of interest to customer 202, customer 202 fills out an application, generally in the form of a questionnaire that is designed to solicit certain preliminary information from the applicant. The information to be provided may include the name of the applicant, his birth date, any governmental form of identification such as his driver license number and/or his social security number, his age, certain lifestyle data, superficial medical history, and the like. Agent 204 then forwards the application to agency 206, which is an agency representing the insurance product of the insurance carrier that the applicant is interested in.

Generally speaking, agency 206 at this point takes in the application, performs certain administrative quality-control checks such as to ensure that the submitting agent can in fact sell the insurance contract proposed, that all questions in the application have been filled out, that the application is properly signed. Once the preliminary quality-control checks are completed, agency 206 then forwards the application to both service providers 208 and an insurance carrier 210. Typically, the service provider gets specific orders based on the requirements of the carrier that offers the applied for insurance coverage.

The transmission of the application may be made using traditional paper and mailing methods, or may involve the electronic transmission of text/images. After the application has been transmitted, agency 206 continues to monitor the application progress to ensure that the service provider(s) timely perform the requested services and that the application is timely acted upon by the insurance carrier once all the information required by the insurance carrier is obtained.

Service provider 208 may provide various administrative and/or paramedical services. For example, service provider 208 may obtain a health history (e.g., an Attending Physician Statement or APS) from the applicant's physician to be forwarded to insurance carrier 210. As another example, service provider 208 may obtain blood and urine samples from the applicant, and forward the samples to a laboratory 212 for analysis. The results of the analysis by laboratory 212 may be sent back to service provider 208 for forwarding to insurance carrier 210, or, more likely, laboratory 212 may send such analysis directly to insurance carrier 210.

After insurance carrier 210 collects all the requisite information from agency 206, service provider(s) 208, laboratory(ies) 212, and any other participants in the insurance underwriting process, insurance carrier 210 may begin the risk assessment process to determine the probability of whether and when the proposed insured (i.e., the applicant) would likely be making a claim. For life insurance contracts, this risk assessment generally relates to deciding the expected mortality of the applicant in view of the information obtained. Once risk assessment is completed, insurance carrier 210 may then place the applicant in a premium class, which determines the cost of the proposed insurance contract for the applicant given the applicant's own unique circumstances and the proposed insurance limit amount(s).

This premium and/or insurance limit information is transmitted to agency 208 and in turn to agent 204 to be discussed with customer 202. If customer 202 approves, the customer may execute the insurance contract at that point. At this point, the executed insurance contract becomes an enforceable insurance policy, thereby completing the insurance underwriting process.

As can be appreciated from the foregoing, the insurance underwriting process is a complex process requiring information from and coordination with numerous participants in a predetermined sequence. For years, the insurance industry has been underwriting millions of insurance contracts, and has developed techniques for obtaining the necessary information to converting a pending application into a premium-generating policy. However, it is observed by the inventors herein that the current process for insurance underwriting is extremely inefficient and time-consuming. At every step in the chain, there is a significant amount of duplication of efforts and inefficiency.

As one example, agencies, service providers, and carriers often have their own proprietary software for processing and tracking cases (i.e., applications). This is particularly true for independent agents and/or independent agencies and/or service providers. Accordingly, the information transmitted from one participant to another often comes in disparate packages, and often needs to be re-transcribed or translated at every step to simply accomplish data entry.

Additionally, the insurance carrier and/or service providers often receive disparate information related to a case at different times. A significant amount of effort must be spent correlating received pieces of information, all belonging to different cases and arriving at different times. Current industry practice employs the applicant's name and/or date of birth and/or some form of government identification such as an applicant's social security number for correlation. Yet, it is not unusual that one of the participants along the chain mistranscribes a name, a birth date, and/or a social security number, giving rise to confusion for other participants down the chain.

The lack of coordination gives rise to inefficiency. If a certain amount of time has passed and the insurance carrier still has not received, for example, laboratory results pertaining to a particular applicant, the customary way to resolve the problem is for an insurance carrier employee to call or email the agency in charge of the case, asking the agency to contact the responsible service provider to ask the service provider to contact the laboratory and request that the laboratory forward the laboratory analysis to that carrier. This manner of problem resolution of course requires that there be a human being at each participant to handle the call and/or email and to manually resolve the problem.

For service providers, there is no efficient way to receive service orders from different agencies and/or insurance carriers. Again, information from different agencies and/or insurance carriers must be re-transcribed for data entry into the service provider's own order management and tracking software. If an applicant has a special requirement (such as a female applicant requesting that her physical examination be conducted with a female nurse), such information must often be processed manually. Service providers also have difficulties getting status information regarding a particular case from the various laboratories. If a vial of blood sample breaks during transit, and the result is not transmitted to the insurance carrier timely, the service provider may not know until it receives a call from the agency, asking why the insurance carrier has not received the requisite test result. Under this paradigm, the aforementioned problem in correlating information means that a service provider must not only devote human resources to correlate data received from the various agencies but must also devote human resources to answer calls and/or emails from agents, agencies, and insurance carriers about the progress and/or status information on service orders.

Agencies and agents are compensated when the underwriting process completes. Accordingly, agents and agencies are particularly anxious in finding out status data regarding a case, in determining whether additional information is needed to move a case along, whether that information can be provided by the service provider, the applicant, or by the insurance carrier. Given the different participants involved, with each participant employing its own proprietary software to process and monitor cases, there is no easy way for agents and agencies these days to easily monitor the status information pertaining to a case as it moves among the participants, particularly after the case has been forwarded to the service providers and the insurance carrier. More importantly, agents serve as the customer interface function, and the inability to quickly obtain status information in order to meaningfully respond to status inquiries from applicants significantly lowers customer satisfaction. In some cases, the applicant may be sufficiently frustrated about the delay and lack of information to terminate the process with an agent, opting to reapply for insurance with a different agency that can underwrite the policy in a shorter amount of time. In some cases, the applicant may simply quit the process entirely out of frustration.

Perhaps the most visible manifestation of the inefficiency of the current underwriting process can be seen in the average and standard deviation values for the time required to complete a typical life insurance underwriting cycle. According to some industry sources, a typical life insurance contract underwriting cycle currently requires over two months to complete. It is not unusual that some applications take as long as 180 days to complete. From an applicant perspective, the delay is especially frustrating, especially since meaningful status information is difficult to obtain from his agent. From the perspectives of the agents and agencies, the delay means that they are getting paid late for the work done months earlier. For insurance carriers, the inefficiency translates into additional cost in processing each proposed insurance contract. The lengthy insurance underwriting cycle also delay the point in time where an insurance carrier can deem a pending insurance contract a premium-earning policy.

In view of the foregoing, improved methods and arrangements for underwriting and managing insurance policies among the various participants are desired.

SUMMARY OF INVENTION

In one embodiment, a scalable, adaptable, modular, and web-centric Insurance Back-Office System (IBOS) for serving the needs of carriers, agencies, agents, and service providers in the insurance industry is disclosed. The IBOS provides a framework for allowing web-centric collaboration among agents, agencies, carriers, and service providers, using applications that manage applicants, cases, and policies in an efficient and secure manner. The IBOS infrastructure is designed to facilitate the creation of a new application, module, tool, or view in a simplified manner. To ensure data security among the participants, access to tools and business data is role-based, context-based, and user-specific.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

Figure 8:
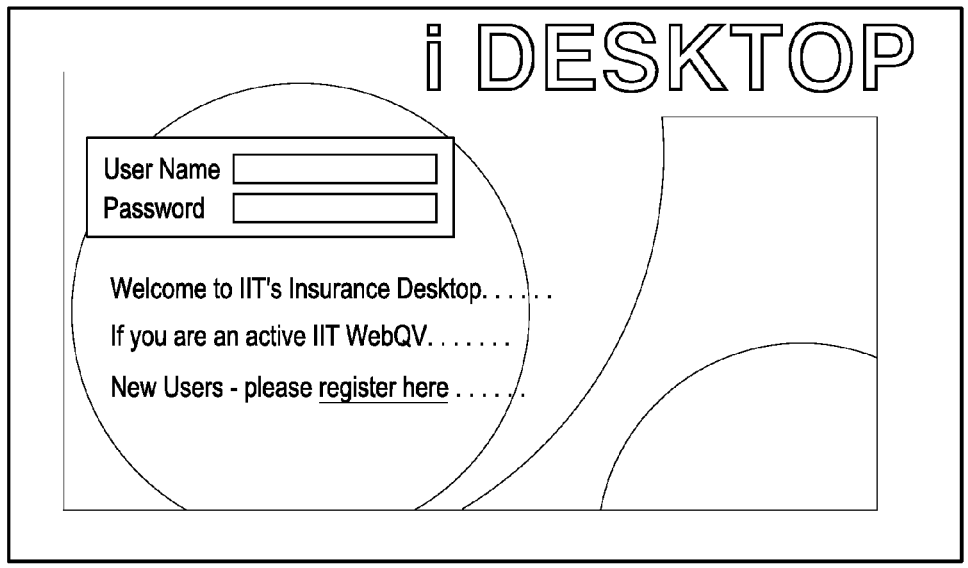

An exemplary login screen for iDesktop™ is shown in FIG. 8.

Figure 9:
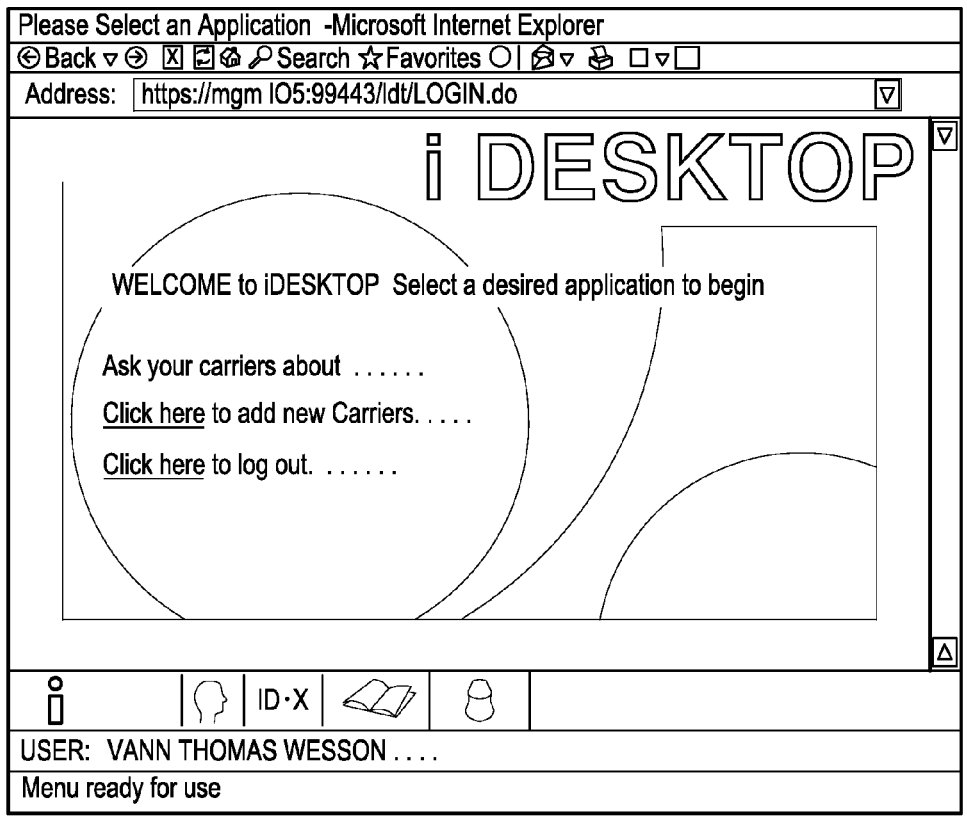

An exemplary home page for iDesktop™ is shown in FIG. 9.

FIG. 10 shows an exemplary page displayed when the user is employing the QuickView™ module.

FIG. 11 shows an exemplary QuickView™ page displaying the summary by carrier view.

FIG. 12 shows an exemplary QuickView™ page displaying the policies list view, showing five policies per page.

FIG. 13 displays another exemplary policy list view after the user has specified in FIG. 12 that 20 policies are to be displayed per page.

FIG. 14 shows an exemplary policy details view, which represents the most detailed display pertaining to a policy.

Figure 15:
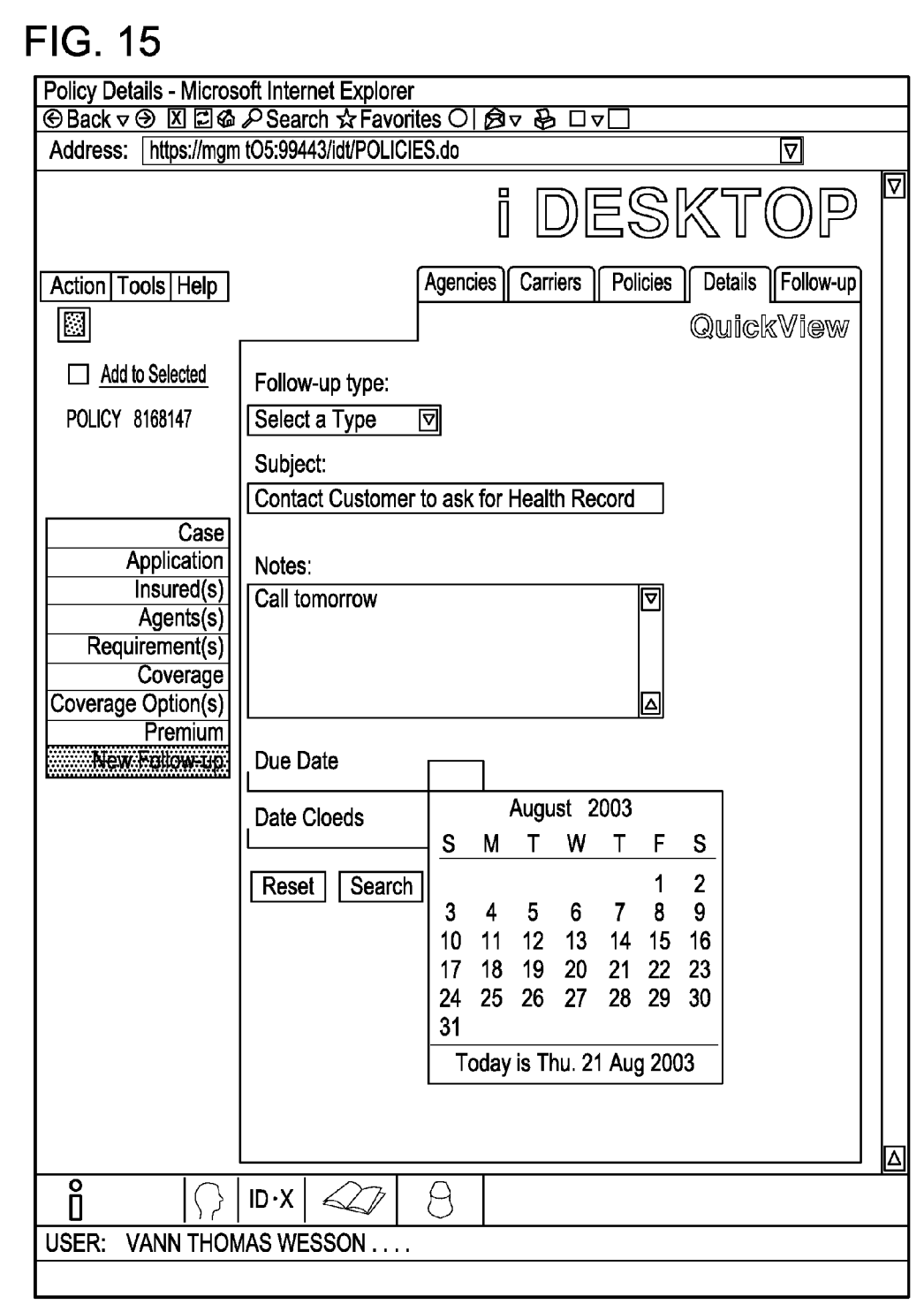

FIG. 15 shows an exemplary screen that the user can invoke to add a follow-up task to the policy shown to the policy details view.

Figure 16A:
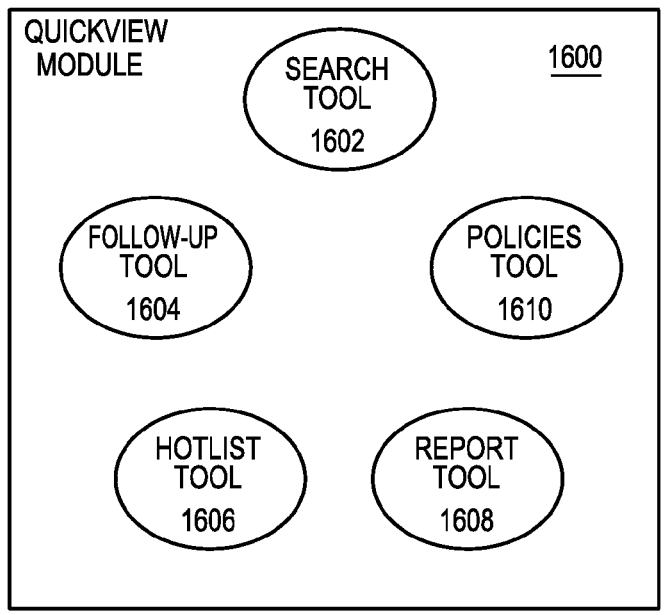

FIG. 16A shows, in accordance with one embodiment of the present invention, the tools available in the QuickView™ module.

Figure 16B:
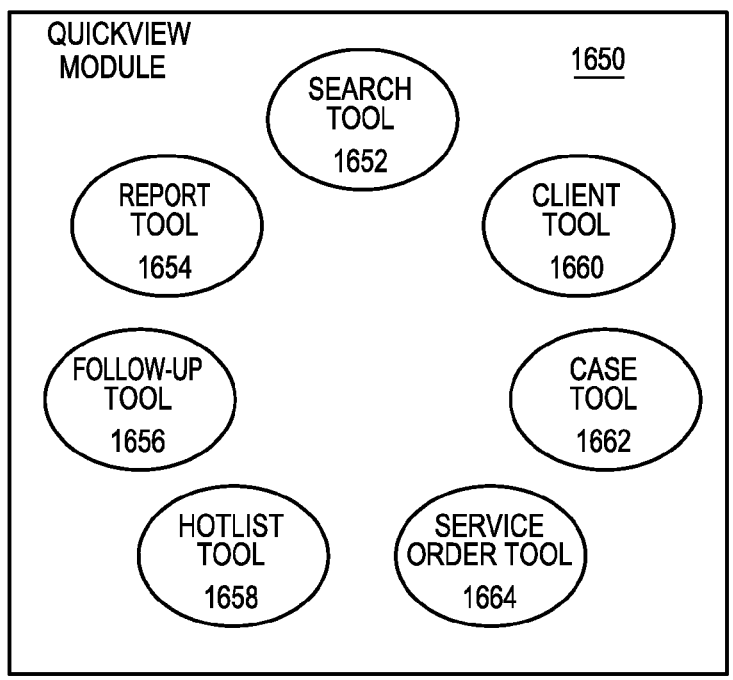

FIG. 16B shows, in accordance with one embodiment of the present invention, the tools available in QuickCase™, in accordance with one embodiment.

FIG. 17 shows, in accordance with one embodiment of the present invention, a workflow for underwriting a policy using iDesktop™.

FIGS. 18-22 show, in accordance with embodiments of the present invention, various exemplary views of the Client Tool of the QuickCase™ module.

FIGS. 23-27 show, in accordance with embodiments of the present invention, various exemplary views of the Client Tool of the QuickCase™ module.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In accordance with one aspect of the present invention, there is provided a scalable, adaptable, modular, and web-centric Insurance Back-Office System (IBOS) for serving the needs of carriers, agencies, agents, and service providers in the insurance industry. The IBOS provides a framework for allowing web-centric collaboration among agents, agencies, carriers, and service providers, using applications that manage applicants, cases, and policies in an efficient and secure manner. To improve user-friendliness, the inventive IBOS leverages on the familiar desktop visual metaphor even though the applications themselves are provided over thin web clients.

To promote secure collaboration in the insurance underwriting and management processes, user access to the IBOS is role-dependent. In other words, the data, views, tools, modules, and applications available to a user of the IBOS depend on the role of the user. To clarify, there are currently two broad roles within the IBOS. It is contemplated, however, that as the product evolves, additional roles may also be implemented, and IBOS is designed such that additional roles can be accommodated easily.

Currently, a user is either an agent/producer ("agent") or a case manager. An agent is the person directly interfacing with the insurance buying public, and who is compensated for his effort in selling the insurance product to the public. A case manager, who may work for an agency, a service provider, or a carrier, is an administrative personnel responsible for gathering and processing information to help a case mature into a policy and to manage a policy once in force. Within these two broad categories of roles, the IBOS is also user-specific in that the identity of the user may also be employed to determine the set of applications/modules/tools (collectively "mechanisms") and the data that he has access to.

The role-based feature allows, for example, an agent using the IBOS to employ role-appropriate mechanisms to view/manipulate data related to clients and/or cases/policies. Being also user-specific, the identity of that agent will be employed to ensure that that agent can view/manipulate data associated only with his clients and/or cases/policies but not to view/manipulate data associated with other agents' clients and/or other agents' cases/policies.

Likewise, a case manager in an agency using the IBOS can employ role-appropriate mechanisms (which may be the same or different from those employed by the agents) to view/manipulate data related to cases/policies assigned to her for managing in that agency. Being also user-specific, the identity of that case manager will be employed to ensure that that case manager can view/manipulate data associated only with the cases/policies for which she is responsible but not to view/manipulate data associated with cases/policies under the management of other case managers in the same agency or in different agencies. The same feature applies for case managers in service providers or in carriers.

Within a case, the user identity and/or role also determines the data that the user can view and/or edit. In other words, a user may have access for viewing to only some data pertaining to a case but not other data based on his user identity and/or role. Likewise, a user may be able to view some data but not edit such data based on his user identity and/or role. As an example, a case manager at a service provider may be able to view selected data pertaining to a case (e.g., the phone number of an applicant for contact purposes) but not others (e.g., the policy limit). As another example, a case manager at a carrier may be able to view certain data pertaining to a case (e.g., the agency in charge of the case) but not edit such information (e.g., cannot change the agency name to another agency).

Thus, while all the IBOS users employ thin web clients (e.g., a browser on a desktop, laptop, or palmtop computer or a browser on a PDA/web-enabled phone) to access the IBOS applications, the appearance of the IBOS to a user may change depending on his/her role, and the data available for viewing and/or manipulation is also dependent on his/her identity. This is one way that the IBOS promotes compliance with privacy protection initiatives in the industry as well as with privacy protection regulations such as the federally-mandated HIPAA (The Health Insurance Portability and Accountability Act of 1996) or GLB (The Gramm-Leach-Bliley Act of 1999).

IBOS is also context-dependent. A context can be characterized by one or more environmental factors that, in combination, sets the context of operation. For example, role, browser type, organization type (e.g., carrier, agency, or service provider), and others all combine to define a context that in turn defines how the application behaves in terms of the modules/tools/views available and the data accessible to a user.

Figure 1:
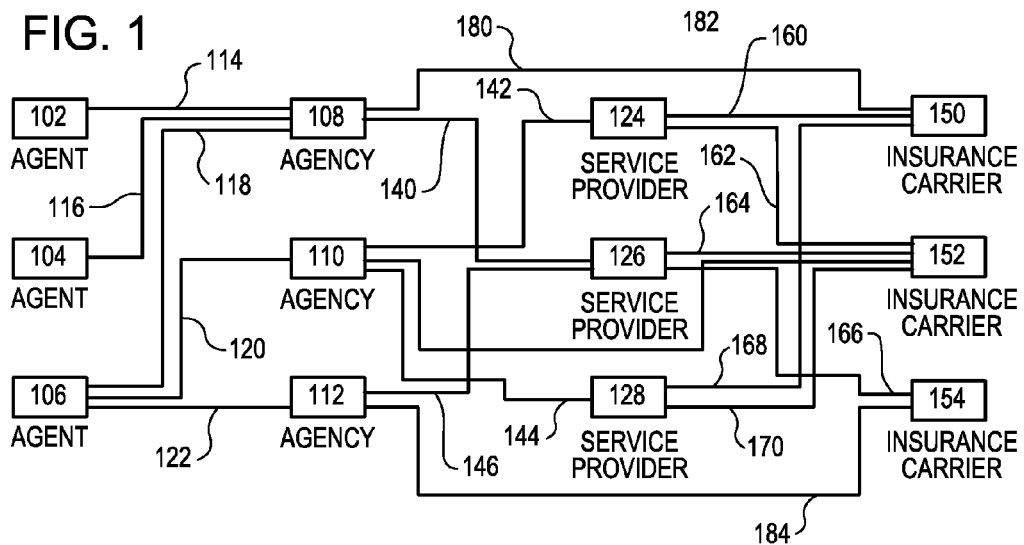
FIG. 1 depicts in a simplified diagram the various participants involved in a typical insurance sales and underwriting process.
Figure 2:
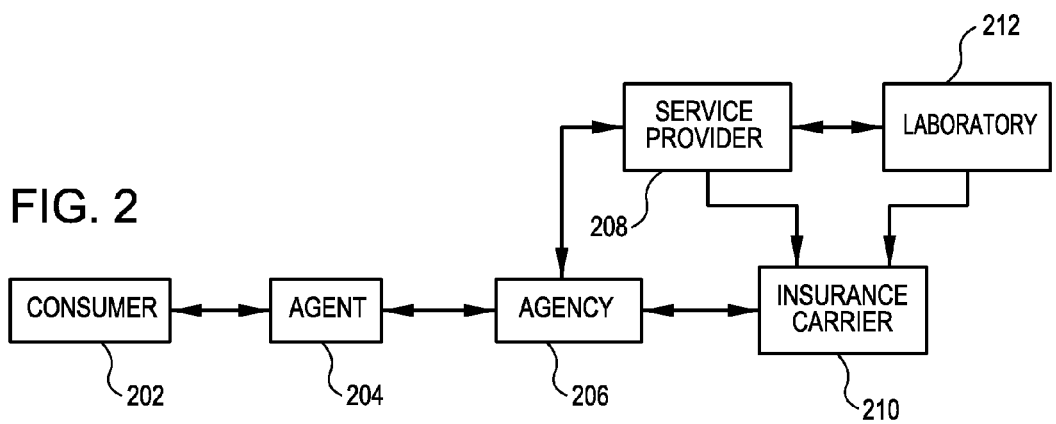
FIG. 2 shows in a simplified diagram a typical insurance underwriting cycle.
Figure 3:
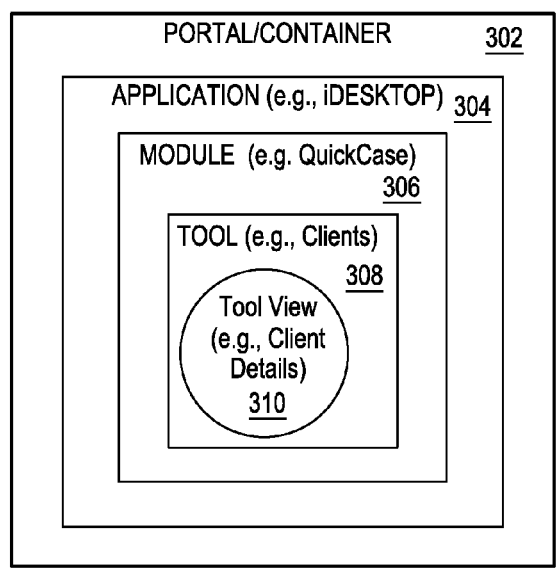
FIG. 3 shows, in accordance with one embodiment, the IBOS architecture components.

The IBOS is implemented by a multi-layer component architecture, with each layer serving as a container for grouping the modular components associated with the layer below it. In one embodiment, the IBOS is implemented by a five-tier architecture: portal/container, web application, module, tool, and view. These the IBOS architecture components are depicted in FIG. 3. At the highest level is the portal/container level 302. Under portal/container level is the application level 304. Application level 304 includes one or more web-centric applications, some or all of which preferably adopt the web-centric desktop visual metaphor provided by portal/container level 302.

With respect to portal/container level 302, the IBOS can be deployed either as a portal hosted by a third-party hosting company or a container/framework for a set of applications, which container/framework is hosted by the company locally at the company's server. The company represents an agency or a service provider or a carrier. The portal model may be an aggregator model or a private-label model.

The aggregator portal model is particularly well-suited to the needs of independent insurance agents who may work for multiple insurance agencies. In this aggregator portal deployment model, a third-party hosting company would host the applications, and agents may be able to login via the internet to use the IBOS applications. For example, the agent may type in "http://login.iitcorporation.com/idesktop" on any web browser to access the login page for the iDesktop™ application hosted by the third-party hosting company IIT (whose URL is at iitcorporation.com). Once the user is authenticated and the user's role/identity is resolved, the role-appropriate mechanisms are then provided for viewing/manipulating of user-appropriate data. It is contemplated that the agent may be charged a fee for such use, which may be, for example, a one-time per case/policy fee or a set monthly fee (which may be scaled based on volume if desired).

The third-party hosting company may also host the IBOS applications for a particular company, in effect providing hosting services for a private-label version of the IBOS. This is the case, for example, agency ABC or service provider OPQ or carrier XYZ wishes to buy or lease a private label version of the IBOS applications so as to promote their name brand to their users, and contracts with the third-party hosting company to host the set of private-label applications for agency ABC or service provider OPQ or carrier XYZ.

In this portal private label model, an agent working for agency ABC may be able may type in "http://login.abc.com/idesktop" on any web browser. The server at abc.com then redirects the user to the third-party hosting company's server in a manner transparent to the agent accessing the IBOS application iDesktop™. Once the user is authenticated and the user's role/identity is resolved, the third party host company server may then serve up a private label version of the IBOS application iDesktop™, which appears to the agent as if it is a IBOS application branded and tailor-made only for the ABC agency. This portal private label model is well-suited to the needs of companies (agencies/service providers/carriers) that may wish to provide private-label access for free for their employees/independent contractors but do not wish to undertake the task of hosting the IBOS themselves. The companies in turn compensate the hosting company (e.g., IIT) for the hosting service and/or for the use of the applications.

The company (agency/service provider/carrier) may also lease or buy the IBOS directly for hosting on a server at their site. In this model, the IBOS acts as a container/framework for the leased or purchased applications. This is similar to the portal private label model except that the IBOS (and thus the portal) is now hosted by the company itself.

Figure 4:
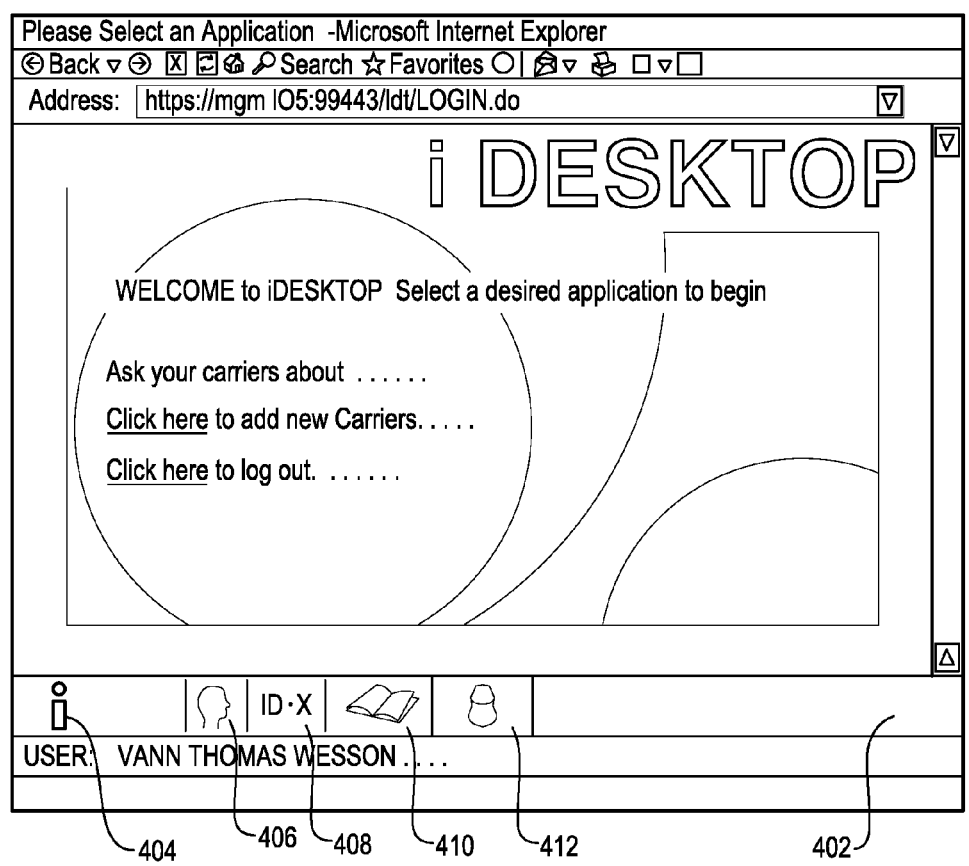
FIG. 4 shows an exemplary screenshot of a IBOS application, iDesktop™.

Applications 304 are preferably implemented as web-centric applications that employ the desktop visual metaphor for accessing modules 306. Leveraging on the user's familiarity with desktop interfaces, such as Windows XP™ by Microsoft Corporation of Redmond, Wash., an application 304 may be structured so as to appear as a desktop to the user. FIG. 4 shows, in accordance with one embodiment of the present invention, an example of a IBOS application, iDesktop™, which allows the participants to manage the insurance underwriting process. iDesktop™ functionalities will be discussed in details later herein.

In the desktop world, the user accesses the desktop applications by clicking on icons on a toolbar. In FIG. 4, there is a toolbar 402, on which an icon 404 is displayed, signaling that the web-centric IBOS application currently employed is iDesktop™. Icons 406, 408, 410, and 412 represent the icons for activating the modules associated with the active application iDesktop™. This is in keeping with the desktop metaphor wherein the user clicks on the icons on the tool bar to activate desktop applications (whereas in the IBOS world in which the desktop is only a metaphor, clicking on the toolbar icons will activate the modules).

Returning to FIG. 3, each application serves as a framework to furnish an infrastructure for plugging in modules. In addition to the aforementioned iDesktop™, other applications exist to serve different insurance management needs. For example, applications directed toward data mining of policy/policyholder data, toward making the client and case intake process more efficient through the use of telephonic or web-based interviews, and the like, may also be accommodated.

The remaining of the disclosure will be made with reference to iDesktop™ as an exemplary application. It should be kept in mind, however, that the invention applies to other applications of the IBOS as well. In general, each application 304 such as iDesktop™, includes a plurality of modules to serve different business logic needs. Generally speaking, each business module comprises a set of business logic functions or features, implemented as tools, that maps closely to the entities being managed.

To clarify, in the IBOS, data is associated with entities. In iDesktop™, for example, the business data can currently be broadly classified as being associated with one of four entities: client, case, policy, or service order. It is contemplated, however, that other entities may exist and the IBOS architecture can readily accommodate additional entities, if additional entities are desired.

In terms of terminology, a client is either a prospective applicant for insurance, an applicant for insurance, or the insured (i.e., policy holder) if the insurance contract is approved and executed. Throughout its lifecycle, the prospective and in-force insurance contract is referred to as a case. Thus, an application for insurance is a case, and so is a pending policy, and so is a policy in-force. A policy is a case after it has been accepted by a carrier for consideration. A policy may be pending policy, which means that the carrier has deemed the case submitted to have enough minimum information to allow the carrier to begin the process of data collection from the service providers and others, of performing risk and premium analysis, and ultimately of approving or rejecting the case. Once the carrier has approved a pending policy and after it is executed by the applicant (and perhaps after the payment of the first premium payment), the pending policy is converted into a policy in force.

A service order is an order for service to a service provider from an agent, an agency, another service provider, or a carrier. An example service order may involve, for example, an order for EFG Company to take blood and urine specimens of an insurance applicant for analysis. The classification of all insurance related data as belonging to one of these four entities vastly simplifies the logic model and user model for implementing and using the iDesktop™ application.

The application framework also includes infrastructure for security control, access control, authentication and verification (user-login), general administration and setup, and the like. It is preferable that each application includes at least three modules: a user profile module to manage user profiles, a general administration module for handling administrative tasks pertaining to the application such as to manage user accounts, and a business module for accomplishing certain tasks related to insurance underwriting or management. Although this organization makes applications easier to implement and navigate, it is not absolutely necessary in all cases.

Modules are configured to be modular, allowing the application to be scalable. For example, iDesktop™ may have seven modules but not all will be required at all times. In fact, modules can be purchased incrementally as need arises. There is, for example, a QuickView™ module for enabling agents and their case managers in an agency to analyze, quantify, and process cases. A QuickCase™ module allows collaboration among agent/agency/service provider/carrier during the underwriting process, up to the time the case is accepted by the carrier and becomes an enforceable policy.

Each module 306 implements a plurality of tools. In one sense, a module may be thought of as a container that provides an infrastructure for plugging in modular tools. Both tools and modules are reusable components, allowing the creation of new modules and/or new applications without requiring a complete rewrite of codes. In other words, certain tools and modules are reusable, and different tools may be grouped to form a new module, and different modules may be grouped to form a new application. Tools can be customized by users using preference settings.

Generally speaking, there are two types of tools: generic tools and entity-specific tools. A generic tools represents a tool that can exist in more than one module and functions in a substantially similar manner in each of the modules in which it is deployed. Examples of generic tools, which will be discussed in details later herein in connection with the QuickView™ and QuickCase™ modules, are hotlist, followup, report and search. Entity-specific tools are tools specific to entities (of which there are four in the exemplary implementation of iDesktop™). Client tools and service order tools are examples of entity-specific tools in the QuickCase™ module.

Each tool 308 may have a plurality of views. Like tools and modules, the views are implemented by code that is modular and also reusable. In most tools, there may be found three views: summary, list, and details. In the case of QuickCase™, a summary view provides an agent with a summary view of the cases he is handling, sorted by some broad criteria (e.g., by carriers). The list view provides, for example, a list of all cases the agent is currently handling. The detailed view provides, for example, the most detailed presentation of data associated with a case undergoing the underwriting process.

One important aspect of the invention is the consistency with which new features/product offerings can be developed and user navigation can be accomplished. By classifying all insurance-related data as belonging to one of the entities (e.g., the four entities of the present example: case, policy, client, or service order), tools can be easily developed. By organizing the architecture into a plurality of discrete architecture levels (e.g., five levels as in the present example), with each level representing a container for bundling the modular components associated with the level below it (e.g., a tool is a container for bundling modular views, a module is a container for bundling the modular tools, an application is a container for bundling the modular modules, and a portal is a container for bundling modular applications), development of new features/product offerings is vastly simplified.

In many cases, the development of a new feature/product offering comprises deciding which architectural level the new feature/product offering belongs to (e.g., a new application, a new module, a new tool or a new view). Once the appropriate architectural level is decided, new feature/product offering may be formed by bundling existing modular architectural components. If existing modular architectural components do not satisfy all the requirements of the new feature/product offering, new code may be written but only to the extent necessary to supplement the existing bundle.

With regard to user navigation, user friendliness is enhanced by leveraging on the desktop metaphor as mentioned earlier. However, navigation is also made consistent in that in an application, users expect to be able to invoke modules by, for example, clicking on the icons in the toolbar as shown in FIG. 4. Within each module, the user will see certain generic tools (e.g., followup, hotlist, search, report) that behave substantially similarly across modules and certain entity-specific module. In one embodiment, within each tool, the user will be presented with certain views (e.g., summary, list, and detailed). This paradigm repeats for all applications, modules, and tools in the BIOS.

Preferably, each module is implemented with a given set of menus and tools. In one embodiment of iDesktop™, all modules are implemented with three menus (action, tool, and help), and two access tools (of which search is one access tool and the other may be a hotlist or summary or the like) on its home page. The action menu provides the user with the actions that can be taken with respect to the entities selected (e.g., cases, policies, clients, or service orders). An example of an action may be send an email to all clients selected, or to group all selected cases into a hotlist (note that hotlist is either an action, denoting that a group of cases or policies is to be marked as high priority, or a hot list may be an access tool, causing the group previously designated as a hotlist to be displayed).

The tool menu furnishes the user with all the generic and entity-specific tools available in the module. Help provides helpful hints in using the particular module. The search tool, which is one of the access tools visible in the home page of the module, allowing the user to search the entities (e.g., cases, policies, clients, or service orders) according to some predefined criteria. In QuickView™ for example, an agent may search for all his cases that has a policy limit between $750,000 and $1,000,000. Summary, as mentioned before, displays the entities in accordance with some predefined criteria, depending on the preference setting. For example, an agent may use the summary tool to view all cases summaries sorted by agencies, carriers, or service providers.

To facilitate collaboration, certain data needs to be shared among the participants of the insurance underwriting/management process. In general, it is preferable that data be encrypted using a highly secure encryption technology (e.g., 128-bit encryption in one embodiment) and using a secure connection technology such as secure socket layer or SSL, (see Internet Engineering Task Force at ietf.org).

In one embodiment, the business database (i.e., the database that includes data regarding clients and/or cases/policies) is hosted at a central hub, and carriers, service providers, agencies, and agents may access data at this central hub. This is the case shown in FIG. 5 wherein there is shown, in accordance with one embodiment of the present invention, an iDesktop™ application 502 and 504 executing at servers associated with an agency and a carrier respectively. There is also shown an IIT aggregator iDesktop™ portal 508, representing the aforementioned aggregator portal.

There is provided a data hub 510, which is responsible for hosting the business database. Data hub 510 includes an integration server 512, which provides business-to-business (B2B) transaction processing. Integration server 512 may include a web application transactional web engine 520, a data translation engine 522, and a workflow engine 524. The transactional engine 520 sends data to and receives data from iDesktop™ applications 502 and 504 to facilitate underwriting a case and/or managing cases/policies. This same engine may also be responsible for sending and receiving data for business partners (carriers, agencies, and service providers), in effect acting as a middleman to facilitate the data transfer among these partners. It is contemplated that a per-transaction or per-case fee may be charged for this middleman service, which may include services such as data translation and public workflow management (discussed below) and others. The transacted data is consolidated in the hub's database, shown in FIG. 5 as relational database management system (RDBMS) 509.

The business data or meta data translation engine 522 translates data and formats data as data is exchanged among agencies, carriers, and service providers. This ensures that the receiving party can receive data in the format that can be easily used and analyzed, thereby eliminating the need for manual transcribing. A business rules engine 526 for managing business rules is shown. The workflow engine 524 in data hub 510 implements public workflows, i.e., workflows among the agents, agencies, service providers, and carriers. A workflow is a bundle of data and subtasks executed in a predefined sequence. An exemplary portion of such a public workflow may include sending an email to notify the agency at the same time that the service provider sends a specimens result to the carrier. The public workflows are handled by the workflow engine at data hub 510 since data hub 510 serves as the hub through which data among the participants may flow and therefore is a natural place for implementing the public workflow logic.

Each iDesktop™ application 502, 504, and 508 may also include a private workflow engine (reference numbers 502a, 504a, and 508a). These workflows are deemed private since they involve data and tasks to be transmitted internally within the participant's organization. An exemplary portion of such a private workflow may include sending an email to both an agent and his case manager, informing both that an application from the agent's client has been examined and another signature is needed before the case can be forwarded to the carrier.

Figure 5:
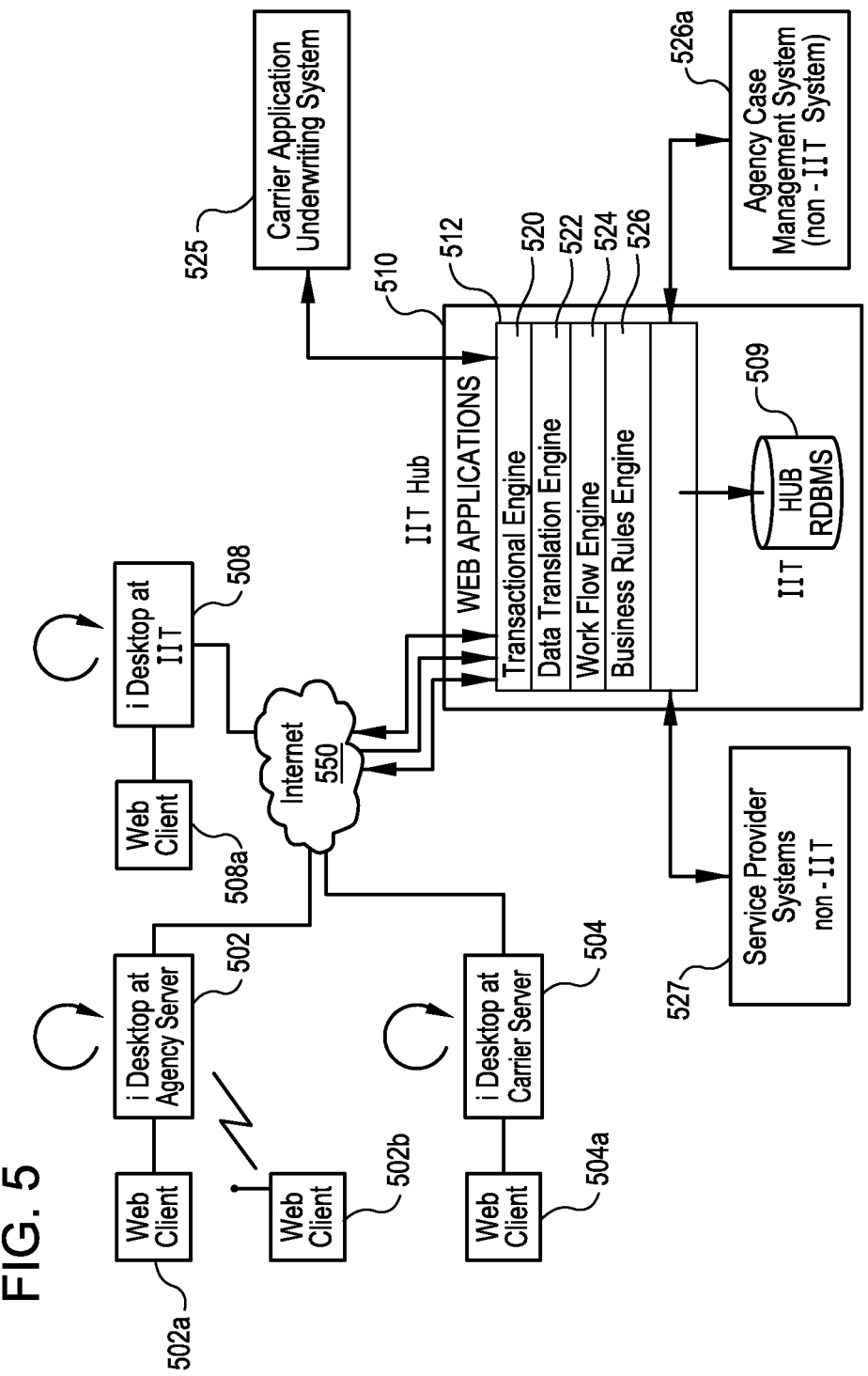
FIG. 5 shows, in accordance with one embodiment of the present invention, one deployment configuration for iDesktop™.

Note that in FIG. 5, each of Each iDesktop™ application 502, 504, and 508 is shown interacting with its own web client (which may be through a wired connection as in the case of web client 502a or a wireless connection, as in the case of web client 502b). IIT hub 510 is also shown coupled to legacy systems, such as the service providers' own order processing system 527, the agency's own case management system 526a, or the carrier's own application underwriting system 525.

Figure 6:
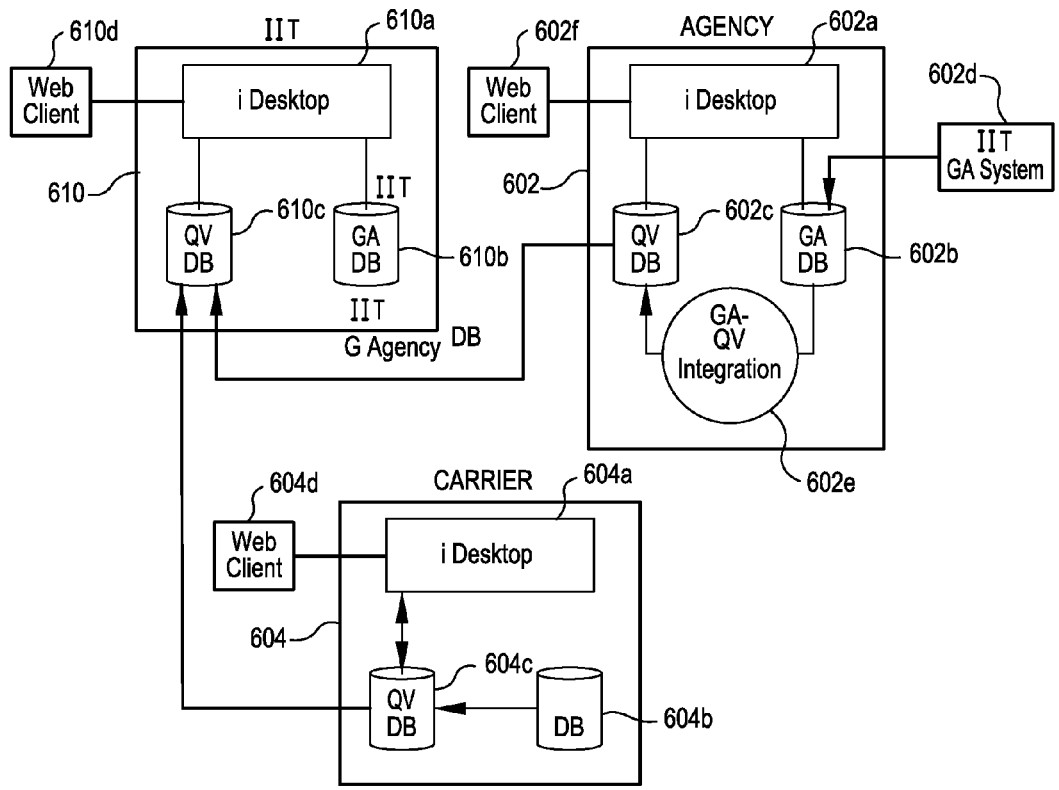
FIG. 6 shows, in accordance with one embodiment of the present invention, an alternative approach wherein each participant (agency, carrier, service provider) hosts its own business database.

It is not necessary that the business database be consolidated at a hub database, such as RDBMS 509 of FIG. 5. FIG. 6 shows, in accordance with one embodiment of the present invention, an alternative approach wherein each participant (agency, carrier, service provider) hosts its own business database. Thus, in addition to iDesktop™ 602a and 604a, each of agency 602 and carrier 604 can use multiple databases: its own internal or third party application or business database, and a database containing data for collaboration. Using the module QuickView™ as an example, agency 602 also manages an agency database 602b and a QuickView™ database 602c. Likewise, carrier 604 also manages a carrier database 604b and a QuickView™ database 604c.

There is also shown a hub 610, with its own iDesktop™ application 610a, IIT global general agency database 610b (also known as IITGA), which contains data pertaining to the plurality of agencies that employ hub 610 to collaborate with service providers and carriers. There is also shown a QuickView™ database 610c associated with hub 610. Generally speaking, IIT hub refers to the central application and database employed to enable data exchange among IIT network and insurance business partners (such as carriers, agents, agencies, service providers).

The collaboration data in databases 602c and 604c are synchronized with hub database 610c using either IIT's data synchronization technology or an industry-standard web services technology. With respect to the carrier-provided data, the data in QuickView™ database (e.g., 610c or 602c) includes carrier-provided data pertaining to updates on approved and currently pending policies. This carrier-provided data from the carrier is synchronized with IIT hub (610) to update the QuickView™ database 610c. Once synchronized, IIT hub 610 then synchronizes the carrier-provided data at the agencies (e.g., in QuickView™ database 602c) to enable the IIT general agency system (IITGA) 602d to view the latest carrier-provided data.

FIG. 6 also shows a GA-QV integration facility 602e in agency 602. There are times when the carrier may have its own legacy or third-party software for case/policy management, and the data provided by the carrier may differ in format from that originally provided to the carrier. Furthermore, the carrier may not even employ the case number assigned by iDesktop™. GA-QV integration facility 602e employs algorithm to match the pending policy provided by the carrier with the case being tracked by iDesktop™ (using for example the applicant name, his address, his birth date, his governmental identification data, and/or the like). Once the match is made, a translation table may be generated to permit correlation between the case being tracked by iDesktop™ and the pending policy tracked by the carrier.

Web clients 610d, 602f, and 604d are also shown in communication with their respective iDesktop™ applications. Although only one web client is shown per application, it should be understood that each iDesktop™ application can service any number of web clients, through a local area network, a virtual private network, or through the Internet, or any other data transmitting network.

Generally speaking, data translation may be performed at the target server (e.g., the server receiving data such as the server at the carrier, agency, or service provider) or more preferably, data translation may be performed by the IIT hub 510 or 610.

As mentioned, iDesktop™ is one application that can be plugged into the infrastructure provided by the IBOS. iDesktop™ allows geographically diverse agents, agencies, service providers and carriers to collaborate in a secure, web-centric environment using the familiar desktop metaphor in order to underwrite and manage insurance policies. It is not necessary that all agents, agencies, service providers, and carriers have a business relationship with one another to employ iDesktop™. Diverse groups of participants can all employ iDesktop™, and since iDesktop™ is role-sensitive, context-sensitive, and user-specific, a user of iDesktop™ can only access data for which he is authorized to view and/or manipulate. Thus, the iDesktop™ application can be made available to thousands of business partners, all working on millions of cases in various permutations of working relationships. The role-based, context-based, and user-specific features mean that ownership for accessing cases for viewing and/or manipulating data is well-defined for each case and each business partner working on that case, and there is virtually no risk of a data security compromise on any case.

Generally speaking, iDesktop™ can be employed by an independent agent who is not exclusively associated with any agency, by an agent who is exclusive with an agency, by a case manager at an agency, by a case manager at a carrier, or by a case manager at a service provider.

Figure 7:
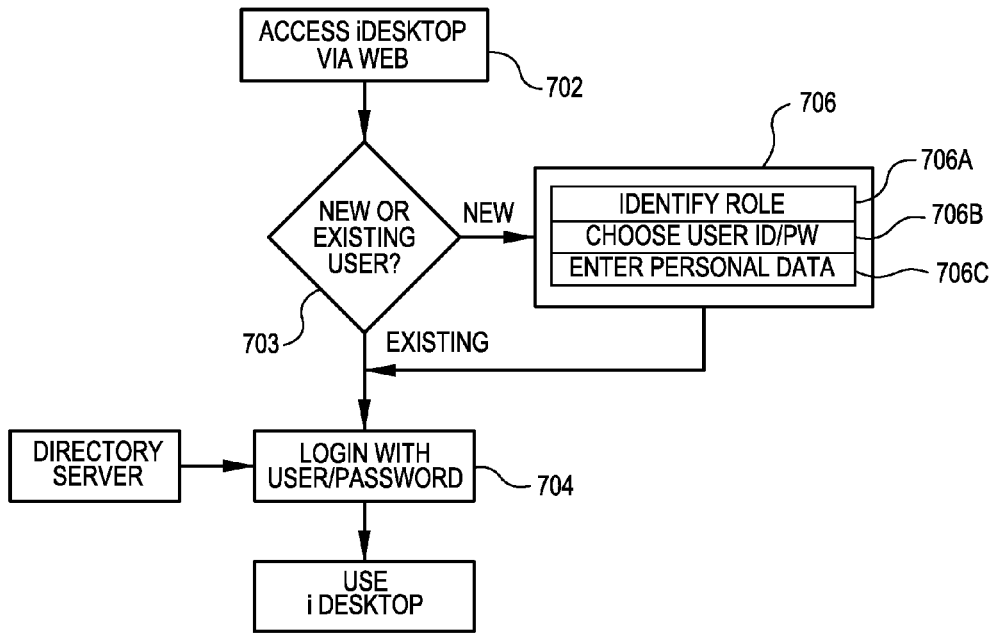
FIG. 7 shows, in accordance with one embodiment of the present invention, the sequence for user login and authentication.

FIG. 7 shows, in accordance with one embodiment of the present invention, the sequence for user login and authentication. The user may access the application iDesktop™ (702) by, for example, typing the appropriate URL into a browser. For example, the user may type in "https://iit.idxtop.com:9443" which brings up a login screen. An exemplary login screen is shown in FIG. 8. In the log in screen, the user may either (703) enter his id/password (704) if he is an existing user or may choose to register if he is a new user (706). If he is a new user, the registration process may require the user to identify his role (i.e., agent or case manager) (706a), to choose a new userID and a password (706b), and to enter his personal data (706c) such as name, address, email, government IDs, and the like. The user may also be required to identify data related to the agency/agencies, carrier(s) and service provider(s) which pertain to his work. Once the registration is completed, the user is taken back to the screen where he can enter his userID and password.

Once the userID and password are entered, the user (whether new or existing) will be authenticated (712). In one embodiment, authentication is performed using a user database that is separate from the business database. Technologies such as directory server (available from the aforementioned Microsoft Corporation or Sun Microsystems, Inc. of Mountain View, Calif.) may be employed during the authentication process. For a new user, the authentication may involve checking with the carrier and/or service provider and/or agency to ensure that the user is authorized as represented by the user. Part of the checking includes ascertaining the business data (e.g., regarding entities such as clients, polices, cases, and service orders) that the user is allowed to access based on his role and his agency/carrier affiliation.

If authentication is successful, the user will be presented with the home page of iDesktop™, which is presented in the desktop metaphor as mentioned earlier. This is shown in FIG. 9. From this home page of iDesktop™ (and indeed from any page from this point onward), the user may then select the module to work on by clicking on the appropriate icon in the toolbar.

In the insurance underwriting and management process, two modules are currently employed. However, additional modules may be involved in additional functionalities are desired. QuickCase™ is employed collaboratively among agent, his agency, the service provider(s) and the carrier to create a completed insurance application. Once the application is accepted by the carrier, it becomes a pending policy. At that point, QuickView™ may still be employed to search, view, and annotate the policies with follow-ups and Quick-Case™ is still employed to facilitate collaboration if an action is needed from one of the business partners (e.g., from the service providers) to turn the pending policy into a policy in force.

In one exemplary implementation of iDesktop™, Quick-View™ is the tool employed by the business partners for collaboratively viewing, researching data and status, and annotating (with follow-ups) on the pending policies and the policies in-force. If a business partner discovers that a pending policy requires action to be taken, the client/case/service order tools in QuickCase™ is then invoked to allow the business partners to work collaboratively.

QuickView™ may be employed to perform many tasks associated with managing policies. For example, an agent or a case manager may employ QuickView™ to view data pertaining to policies and to annotate policies with follow-up data if desired. As another example, the user (agent or case manager) may also employ QuickView™ to create a hot list of policies for special attention. As another example, the user may employ QuickView™ to search/filter policies available to that user to come up with a search result comprising policies selected in accordance with some search criteria. As another example, the user may create reports on any of the views displayed or on the policies using appropriate reporting criteria.

In one embodiment, the following tools are available in the QuickView™ module: policies tool, follow-ups tool, reports tool, hotlist tool, and search tool. Policies tool is employed to view policies. In the policy tool, the following views are available: summary by agency view (all policies for the user organized by agencies), summary by carrier view (all policies for the user organized by carriers), policies view (list of policies for the user), policy details view (the most detailed view available for a policy), policy follow-ups view (all policies earlier designated for follow-up tasks for the user) and policy hotlist view (all policies earlier designated as a hot list for special attention for the user). Followup tool is employed to designate one or more selected policies for a particular follow-up task (e.g., call at 3 PM on August 12, email service provider to request a female nurse to examine this applicant, etc.) Reports tool is the report generating utility to create policy reports according to some report generation criteria, which reports may be created in an electronic form or a printed form. Search tool allows the user to search for an entity (case, policy, service order, client) according to the search criteria entered.

In the QuickView™ module, a page displayed preferably comprises of three main parts: module menus (e.g., action, tools, and help), module tool in focus (e.g., policies tool), and search tool form. FIG. 10 shows an exemplary page displayed when the user is employing the QuickView™ module. In FIG. 10, the search tool form is shown by reference 1002. In the case of FIG. 10, the module tool in focus is the policies tool, which shows the summary of cases (1018) by agencies view. The module menus action, tools, and help are shown by reference numbers 1004, 1006, and 1008 respectively. The summary-by-agencies view, summary-by-carriers view, policies list view, and hotlist views may be invoked by clicking on tabs 1010, 1012, 1014, and 1016 respectively.

Preferably, the aforementioned three-part organization stays consistent throughout the various pages of the modules and across different modules (e.g., QuickCase) so as to reduce the learning curve for new users, to render navigation consistent, thereby promoting user-friendliness, and to render the implementation of a new modules simple.

FIG. 11 shows an exemplary QuickView™ page displaying the summary by carrier view (which is displayed by clicking on tab 1012). FIG. 12 shows an exemplary Quick-View™ page displaying the policies list view (which is shown by clicking on tab 1016). The policies list view of FIG. 12 further comprises an option 1202, which allows the user to choose the number of policies displayed per page, an option 1204, which allows the user to manipulate icons to move between pages in the policies list view, and an option 1206, which allows the user to remember the view currently displayed in the page as a search criteria in the search tool. The saved search criteria may be saved with a name, and may be recalled by name at a later time to allow the user to quickly access the data previously displayed. FIG. 13 displays another exemplary policy list view after the user has specified in FIG. 12, using option 1202, that 20 policies are to be displayed per page.

FIG. 14 shows an exemplary policy details view, which represents the most detailed display pertaining to a policy. This view may be invoked by clicking on any policy displayed in any of the views displaying one or more policies in a summarized format (e.g., any of the summary views, hotlist view, followup view, search result view, policies list view, and the like). Clicking activates the hyperlink associated with the policy summary data, allowing the page showing the policy details to be displayed.

FIG. 15 shows an exemplary screen that the user can invoke to add a follow-up task to the policy shown to the policy details view. The user can arrive at the display screen of FIG. 15 by selecting the follow-up tool 1402 in FIG. 14, for example.

As mentioned, iDesktop™ is user-specific. Accordingly, policies viewable by some agents may not be viewable by other agents and/or case managers. iDesktop™ is also role-specific. Accordingly, a case manager may not have some of the views available to agents. For example, a case manager employed with a specific agency would see only cases associated with that agencies. In which case, instead of a summary by agencies view, the case manager may be presented with a summary by agents view or summary by service providers view or summary by carriers view for all the cases assigned to her to manage. As another example, a case manger employed with a carrier would see only cases associated with that carrier. In which case, instead of a summary by carriers view, the case manager may be presented with a summary by agencies view or summary by service providers view for all the cases assigned to her to manage. This is an example of how the role-specific feature of the IBOS both improves efficiency/user-friendliness and promotes data security and confidentiality.

FIG. 16A shows, in accordance with one embodiment of the present invention, the tools available in the QuickView™ module 1600. As shown in FIG. 16A, there are four generic tools: search tool 1602, followup tool 1604, hotlist tool 1606, and report tool 1608. There is also an entity-specific tool, which is policies tool 1610. These have been discussed earlier herein.

FIG. 16B shows, in accordance with one embodiment of the present invention, the tools available in QuickCase™, in accordance with one embodiment. QuickCase™ may include search tool 1652, reports tool 1654, follow-ups tool 1656, and hotlist tools 1658. As mentioned before, these are generic tools and they function in a substantially similar manner as their counterparts in other modules. In addition, there are three entity-specific tools: client tool 1660, case tool 1662, and service order tool 1664.

Client tool 1660 may be employed by the agent to obtain information about a client and build a client profile. With respect to the exemplary workflow of FIG. 17, the client tool may be employed in step 1702 to obtain at least certain preliminary data regarding the applicant for insurance such as his name, his age, and superficial lifestyle data such as whether he smokes or skydives. Case tool 1662 may be employed by the agent to begin filling out data regarding the insurance policy the client wishes to purchase (1704 in FIG. 17). For example, the client may indicate that he wishes to purchase term life insurance for 20 years, with a $1,000,000 limit. During the underwriting process, case tool 1662 may also be employed to view and/or annotate the cases, much in the same manner that policies tools may be employed for policies in QuickView™.

Once preliminary client and case data is obtained, the client may also employ the QuickQuote™ tool (1706) to search among carriers for insurance products that fit the requirements of the client and to provide some preliminary premium quote and/or to provide alternative products that may also be of interest to the client. At this point, the agent may associate the case to be underwritten with an agency, if such association hasn't been done as a default (e.g. as in the case where the agent is an exclusive agent of an agency).

Suppose the client chooses one of the insurance companies to pursue further. In one embodiment, the case is then assigned with a unique case number in iDesktop™, which subsequently serves as the primary correlation key for correlating all communication and data from various business partners pertaining to this case. If a communication or data is sent from one of the modules of iDesktop™ pertaining to a case, the unique case number is automatically sent along to allow the receiving server to easily correlate all communication and data pertaining to a case. In this manner, the invention advantageously avoids the prior art problem of trying to resolve communication and data pertaining to a case based on data that may be erroneous or duplicative.

As mentioned, if a carrier employs a legacy systems that works only with the carrier's own case number, the correlation algorithm may be employed to, for example, match the pending policy as sent back from the carrier with the case being tracked in iDesktop™ (based on, e.g., a combination of applicant name, birthdate, social security number, and the like). Once a match is found, a correlation table may track such mapping to allow the business partners to easily correlate communication and data pertaining to a case when collaborating using iDesktop™.

In step 1708, the agent or a clerk at the agency may employ the service order tool 1664 to order services, such as blood or urine tests, from service provider (1710). Ordering service causes the service order tool to send the order, along with relevant data (e.g., contact information for the applicant) to the service provider(s). Furthermore, the agent or clerk at the agency may employ QuickCase™ to send data pertaining to the partially completed case 1712 to the carrier (1714). Service provider 1710 may also employ QuickCase™ to collaborate with sub-contractors (such as laboratories) to obtain analysis service for urine specimen, for example.

The service provider 1710 may also employ QuickCase™ to collaborate with the carrier and/or other sub-contracting service providers to furnish the required information to the carrier to allow the carrier to evaluate the pending policy.

The agent, agency, and carrier may employ QuickView™ to monitor the progress and status of the case. For example, a case manager at a carrier may employ QuickView™ to ascertain whether all data required from the agency has been received and whether all data required from the service provider has been received timely at the carrier. Tools such as follow-ups, reports, and hot lists may also be employed to manage cases. Likewise, a case manager at the agency and/or agent may employ QuickView™ to track the progress of a case. For example, the agent may designate a case to be one in his hot list, and he may note that it has taken abnormally long for the service provider to provide the urine specimen analysis result to the carrier. The agent may then follow up with the service provider by sending an email or by another alerting/communicating facility within QuickCase™ to request that the urine analysis result be sent as soon as possible.

When a business partner completes a business task with respect to a case (e.g., the agency sending a case to the carrier or to the service provider, the service provider obtaining a urine sample and sending the sample to a laboratory for analysis, a carrier receiving a blood sample result from a laboratory or a service provider), that business partner updates status information for the case in iDesktop™. Thereafter, business partners authorized for viewing the case data may readily obtain status/progress information pertaining to the case at any time using, for example, Quickview™.

Once all the required information is obtained from the service providers and agent/agency, the carrier 1714 may then either accept the pending policy, which becomes a policy in force (1716) after execution by the applicant or the carrier 1714 may reject the policy and employ QuickView™ to inform the agent/agency of the rejection (1718).

Figure 18:
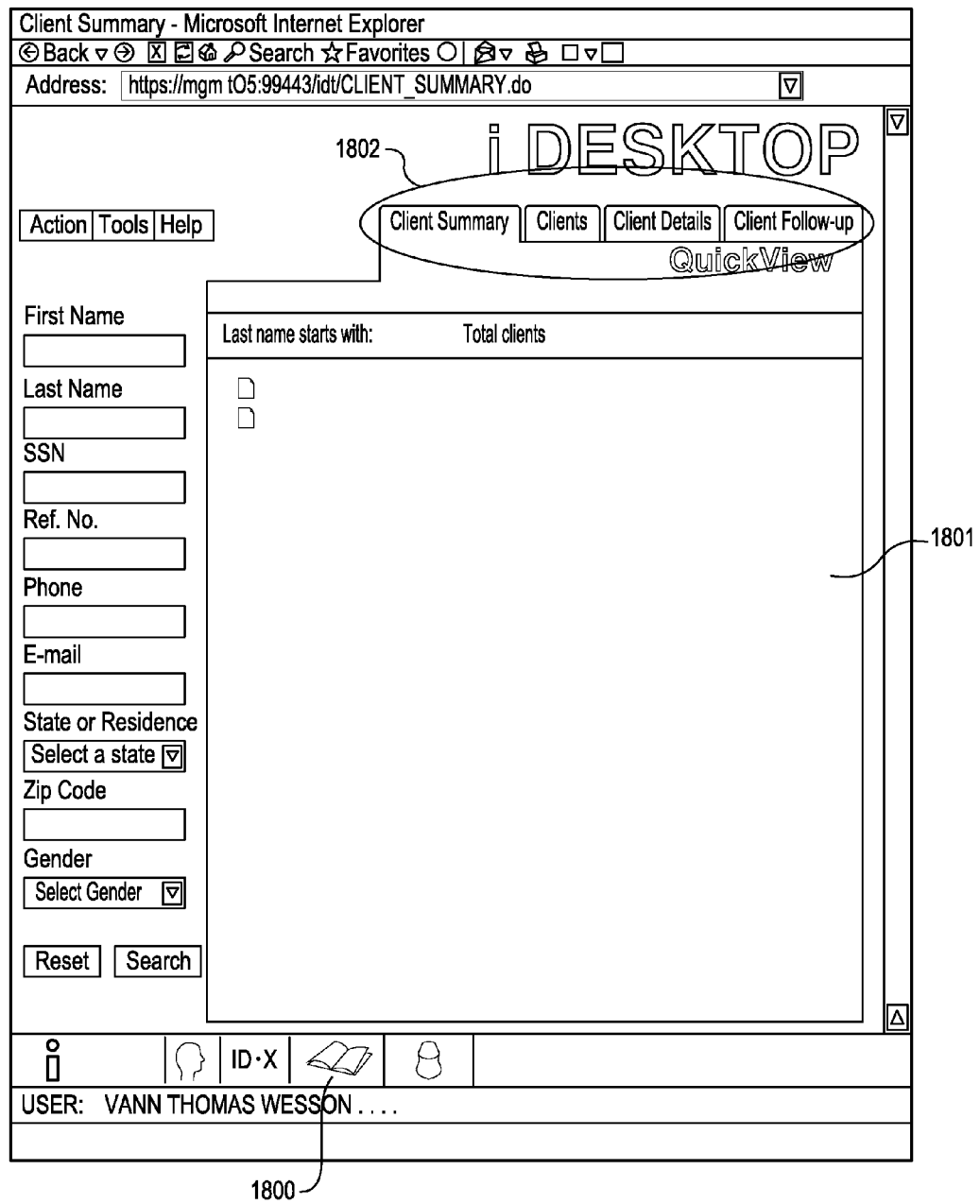
Figure 19:

FIGS. 18-22 show, in accordance with embodiments of the present invention, various exemplary views of the Client Tool of the QuickCase™ module. In FIG. 18, the QuickCase™ module is activated by pressing on the "book of business" icon 1800 in the tool bar. Notice how the navigation options and visual presentation on the screen 1801 follows the theme of the present example: 3 menus and two active tools. In the present example, the default QuickCase™ has an active Clients and Search Tool. The Clients tool views are shown by 1802. FIG. 19 shows a Clients List view in the Clients Tool.

FIG. 20 shows the Clients Details View. The Client Profile Form is shown in 2002, and the user can press icon 2004 to get a print-formatted report of client details. The user can also add client to list of selected items for action (2006). By using one of detail tabs 2008, the user can obtain/access addition data pertaining to the specific client in focus.

Figure 21:
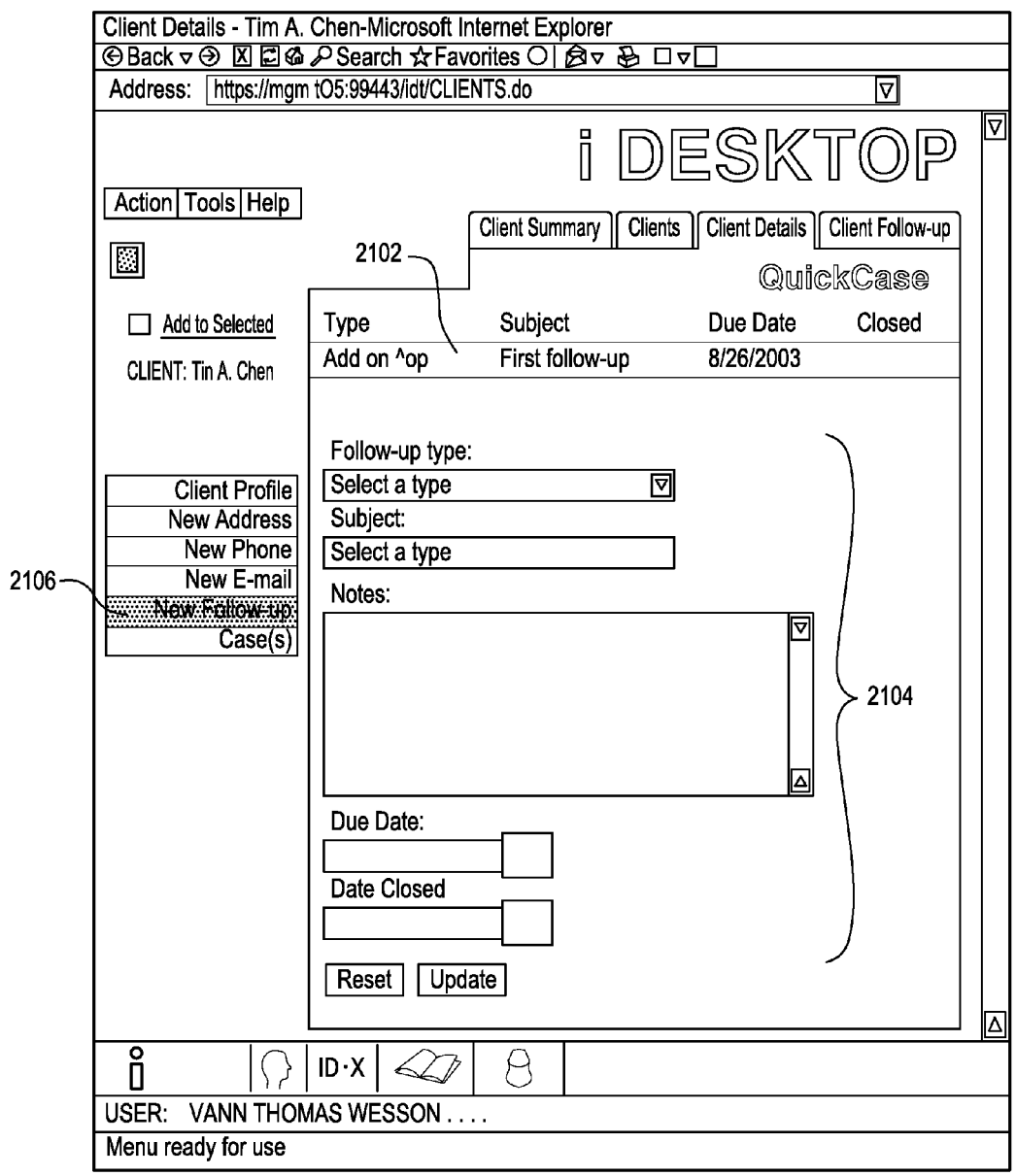

FIG. 21 shows a Client Followup screen. The list of follow-ups for the client is shown in 2102. The new/updated follow-up form is shown by reference 2104. The screen of FIG. 21 is accessed by selecting New Follow-up tab 2106 shown.

FIG. 22 shows a Client Follow-Up List View. All clients with follow-up items are shown in the list 2202. The user can navigate to follow-up detail screen by clicking on the Client name 2204 (since all data shown in iDesktop™ is hyperlinked). By selecting option 2206, the user can select the entity displayed (e.g., client) for follow-up action such as print report, add to hot-list, etc). The search tool form is shown by reference number 2208.

FIGS. 23-27 show, in accordance with embodiments of the present invention, various exemplary views of the Case Tool of the QuickCase™ module.

As mentioned, agents may employ the Case Tool to create cases for existing or new clients. A new case for a new client may require the gathering of certain data pertaining to the new client via the Client tool first, in one embodiment. The Case tool has, in one embodiment, case summary, case list, and case detail view. As in other iDesktop™ modules of the present example, there are provided search, follow-up, and hotlist tools.

Figure 23:
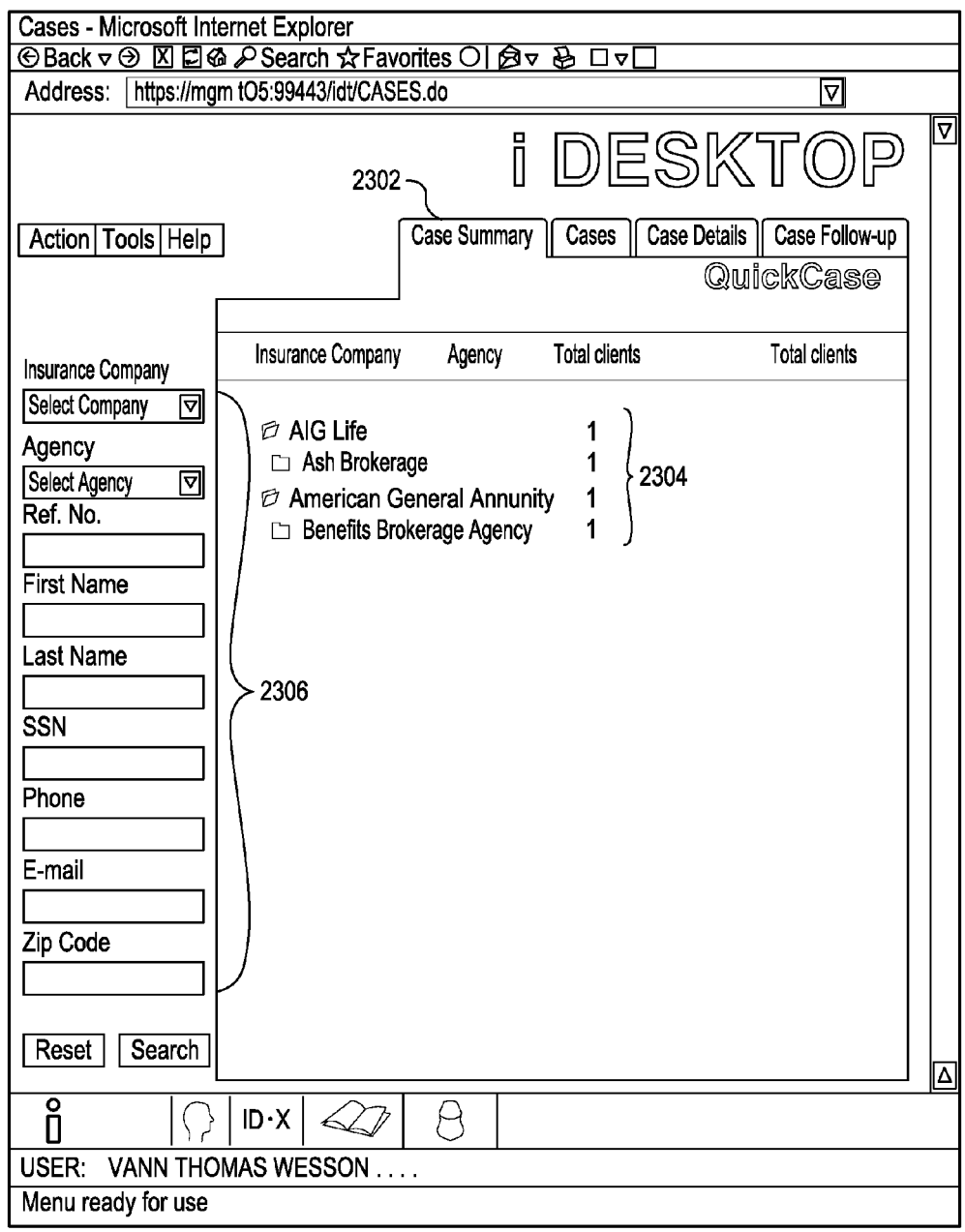

The summary view is shown in FIG. 23. This is activated by the summary view tab 2302. The customized drilldown GUI 2304 displays summary of all user cases. The case search tool is again shown by reference number 2306.

Figure 24:
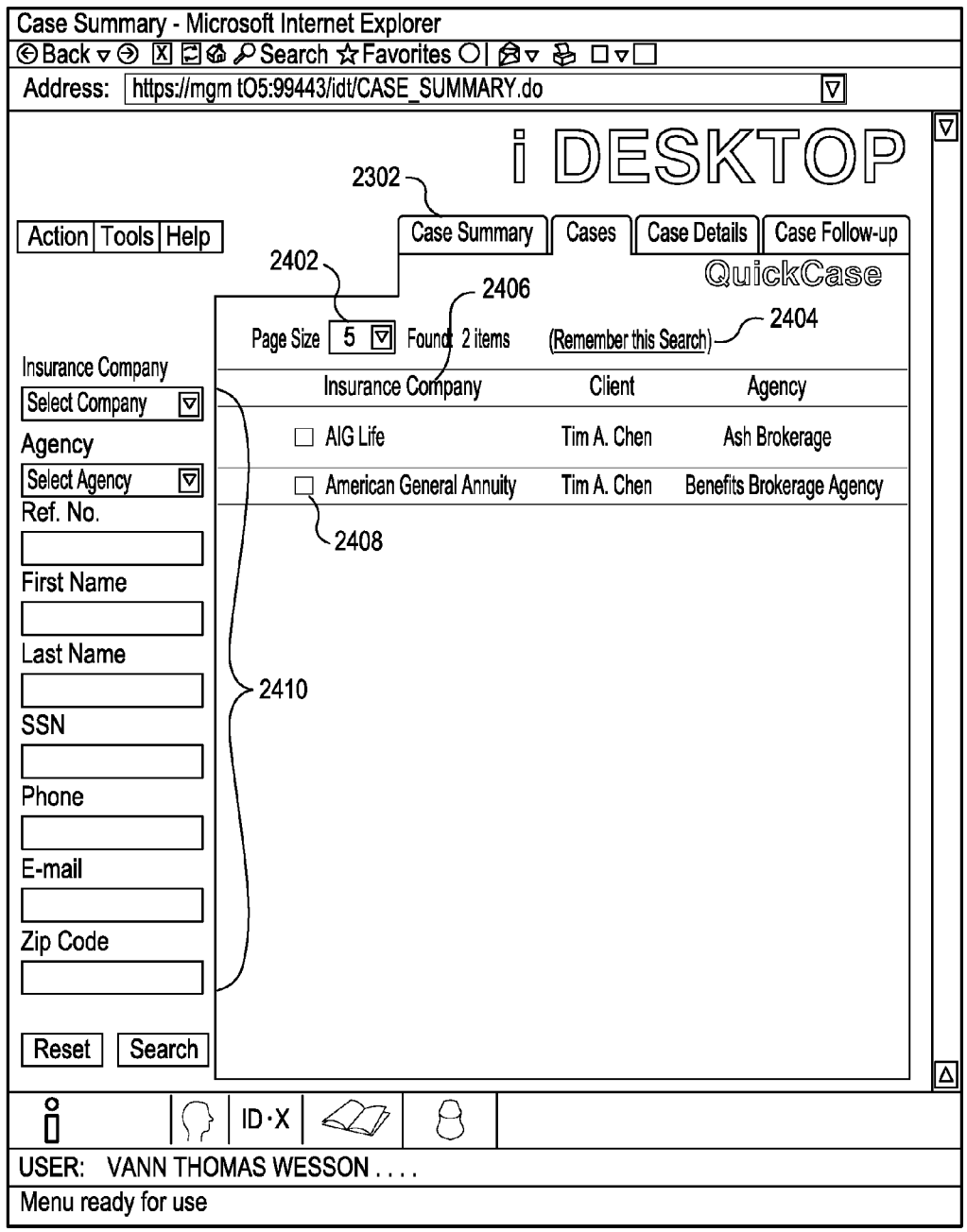

FIG. 24 shows the Case List view of the Case Tool. The user can choose the number of cases to be displayed per page (2402), and can save (2404) the view as a search criteria to access later, if desired. The columns 2406 are sortable using a preference setting for criteria or by setting options in a popup menu, for example. The case displayed can be selected (2408) for further action, if desired. The case search tool is again shown by reference number 2410.

Figure 25:
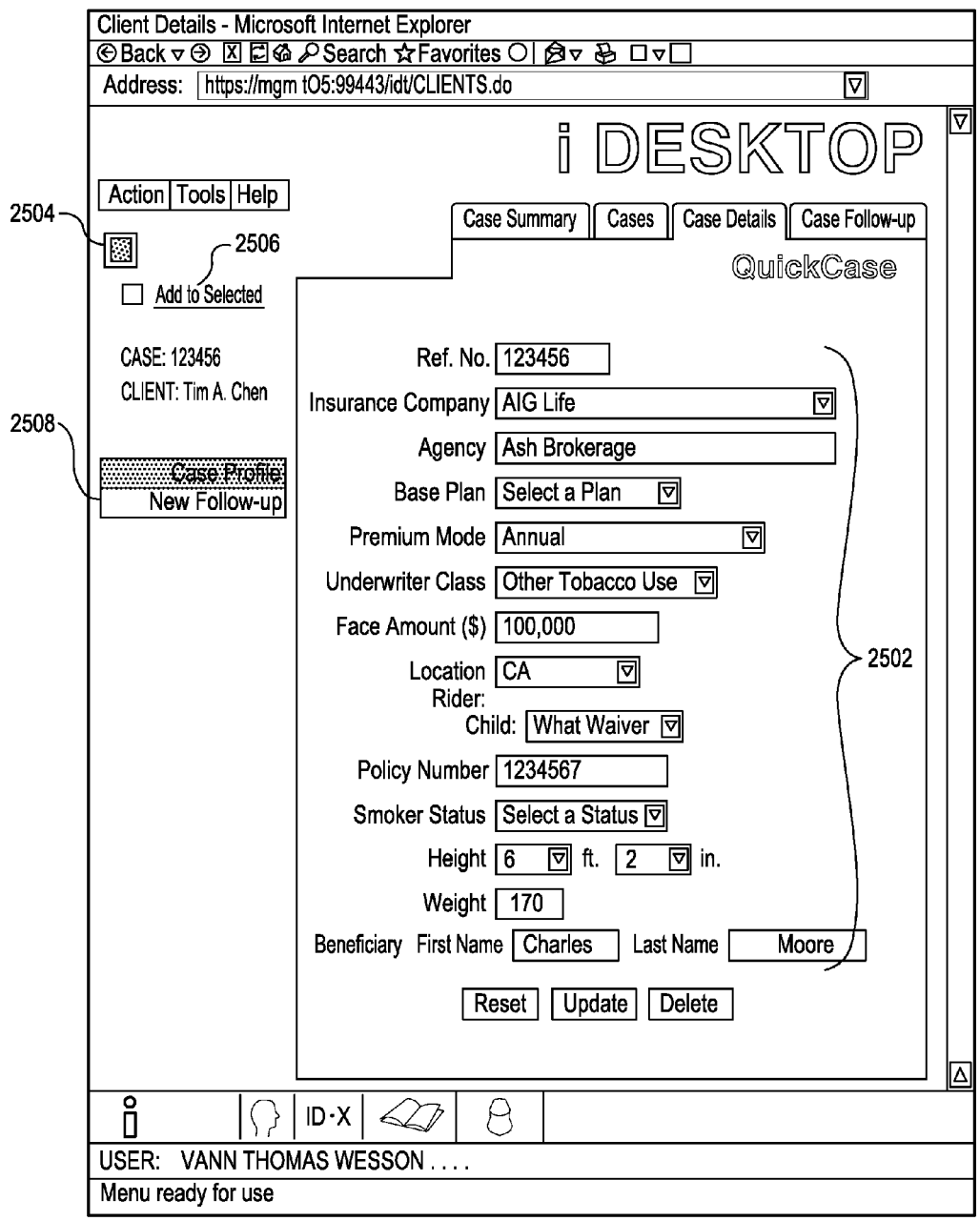

FIG. 25 shows the Case Details View. The Case Profile Form is shown (2502). User can selection option 2504 to get a print-formatted report of the case details. The user can add the case to the list of items (2506). Through detail tabs 2508, the user can access other data pertaining to the case in focus.

Figure 26:
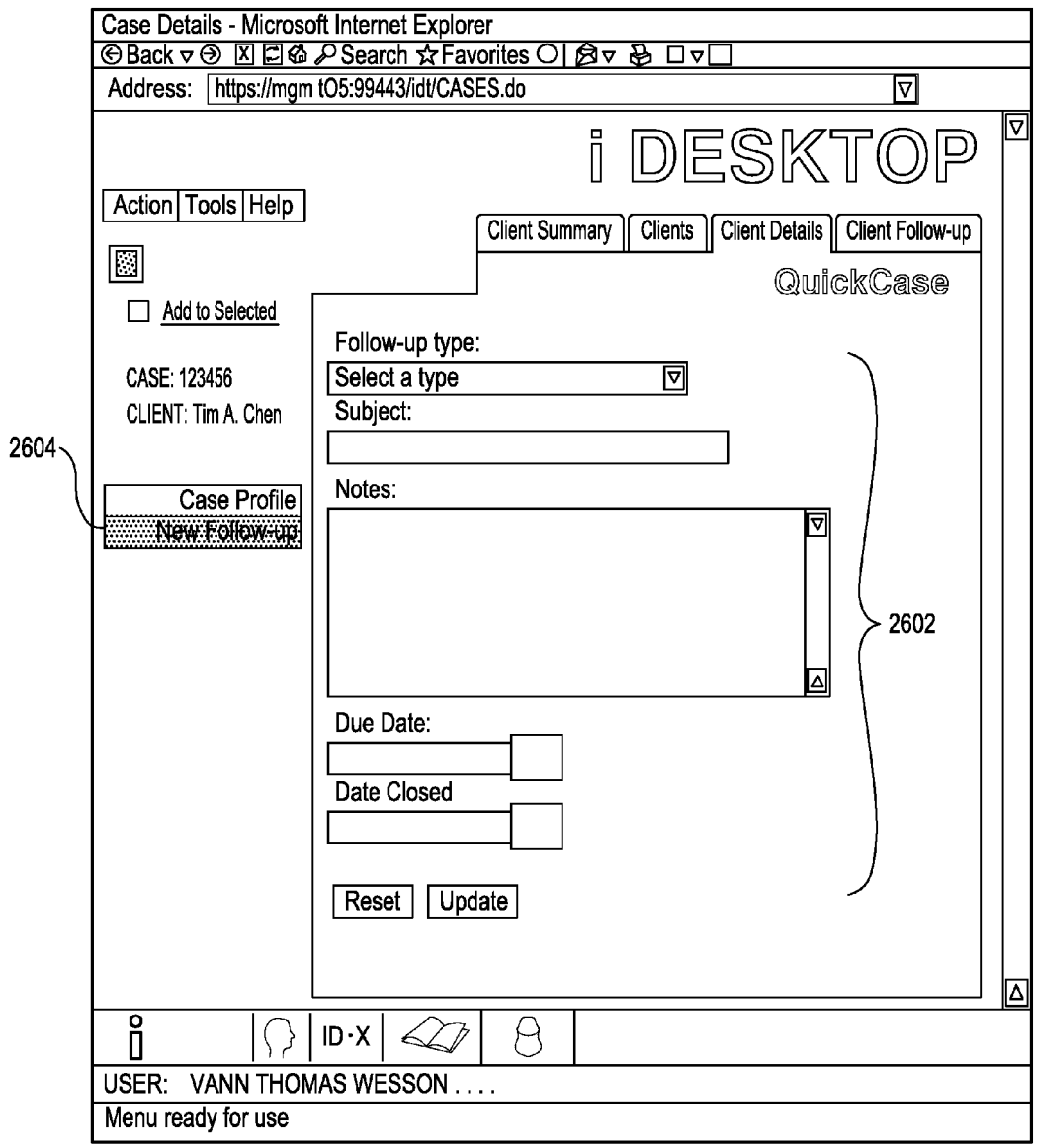

FIG. 26 shows the Adding New Followup view of the Case Details View. The New Follow-up form is shown (2602). The view of FIG. 26 is accessed by selecting the New Follow-up tab 2604.

The Case follow-up view 2700 is shown in FIG. 27. All cases with follow-up items are shown in the list 2702. The user can navigate to follow-up detail screen by clicking on the Case reference number 2704 (since all data shown in iDesktop™ is hyperlinked). By selecting option 2706, the user can select the entity/entities displayed (e.g., client) for follow-up action such as print report, add to hot-list, etc). The search tool form is shown by reference number 2708.

Since iDesktop™ is intended to be web-centric, security is an important concern. Security among participants is assured by leveraging on the role-based and context-based feature, enabling a user to only access the subset of data he is authorized to access. Access control includes authentication and validation while all data transfer is preferably encrypted (e.g., 128-bit encryption) using a secure connection (such as SSL). To enhance security, the data related to user access (e.g., the user data base) is separated from the business data, which can only be accessed by the application server through a firewall, using a secure connection. Once the user is authenticated using the access database, the user may employ the application(s) on the application server to access the business data. Both the access database and the business database may also be physically secured in a secure physical location (e.g., a vault).

In accordance with one embodiment of the present invention, there is provided a view-state database or table for tracking the current states of the views of various tools. The view-state database is preferably persistent in that the user can log off and the view-state database will remember the states of the various views at log-off. When the user logs in again, the views associated with the various tools are restored. As another example, a user may switch among tools while using QuickView™ or QuickCase™. The view-state database tracks the states of the views of the various tools and if the user returns to the previous tool, the view associated with that tool that was displayed just prior to switching is restored, along with all the data associated with that view. This is useful for insurance agents who deal with constant interruptions from different clients and who may need to be able to switch among tools often.

As can be appreciated from the foregoing, collaboration using the web-centric, collaborative IBOS and iDesktop™ application allows information, status, progress and instructions pertaining to a case to be efficiently manipulated, transmitted, tracked, and shared among business partners authorized to view and/or manipulate that case. This solves the problems in the prior art that arise when different participants in the insurance process employs different software to track, process, and transmit information pertaining to a case.

Further, the ability for the business partners to employ the collaborative, web-centric IBOS and iDesktop™ application to communicate among themselves to resolve problems (e.g., through emails, notifications or private messenger messages that tie to the unique case number) as well as the ability to easily view a case status and progress at any time renders the insurance underwriting and management processes substantially more efficient.

The use of a single unique case number to track a case within iDesktop™ as well as the ability to automatically associate insurance information and instructions sent via iDesktop™ with the unique case number during transmission and receiving times substantially eliminate the problems associated with correlating communication and data to cases in the past.

Since the agent can now obtain progress and/or status data pertaining to a case at any given time from any web-enabled device, customer service is substantially improved. The agent can now respond to a customer's request for status with accurate information. The agent can also track the cases, and take action to speed up the conversion of a pending policy to a policy in force (e.g., by sending a timely reminder email to the right party to take the next step in the process), the invention can substantially reduces the amount of time required to underwrite a policy.

While this invention has been described in terms of several preferred embodiments, there are alterations, permutations, and equivalents which fall within the scope of this invention. For example, although agents are discussed as being either independent or working exclusively for an agency, the invention also applies to agents who works directly for carriers without agency intervention, either on an independent basis with multiple carriers or exclusively with a carrier. It should also be noted that there are many alternative ways of implementing the methods and apparatuses of the present invention. It is therefore intended that the invention be interpreted as including all such alterations, permutations, and equivalents as fall within the true spirit and scope of the present invention.

What is claimed is:

1. A method for facilitating communication in an insurance-underwriting process, the method comprising:
   providing a plurality of participants access to a central data repository via a web-based computer system for storing and organizing data related to the insurance-underwriting process;
   storing and organizing data related to the insurance-underwriting process in the central data repository;
   enabling, by the web-based computer system, collaboration among at least two participants of said participants from the plurality of participants via the Internet using the web-based computer system, the web-based computer system comprising a web-based portal providing each participant access to one or more of a plurality of web-based applications hosted by one or more application server computer systems based on one or more attributes associated with the participant, each of the plurality of web-based applications employing a consistent desktop visual metaphor having at least a business module menu portion, an active business module tool portion, and a toolbar;

sharing, by the web-based computer system, at least a portion of said data among the plurality of participants;

generating, with one or more processors associated with the web-based computer system, information configured for displaying the desktop visual metaphor associated with a selected web-based application in the plurality of web-based applications to a participant accessing the web-based portal from a client device based on a role associated with the participant, the desktop visual metaphor associated with the selected web-based application including:

a toolbar configured with one or more visual representations for each of one or more of a plurality of business modules associated with the selected web-based application that are accessible to the participant based on the role associated with the participant, each of the plurality of business modules having a plurality of business logic tools, a business module menu portion configured with one or more menu items for each of one or more of the plurality of business logic tools associated with a selected business module in the plurality of business modules that are accessible to the participant based on the role associated with the participant, each of the plurality of business logic tools having a plurality of views configured for displaying data stored in the central data repository, and an active business module tool portion configured with one or more of the plurality of views associated with an active business module tool in the plurality of business module tools that is accessible to the participant based on the role associated with the participant; and restricting, by the web-based computer system, the plurality of business logic tools and portion of said data accessible to the participant.

2. The method of claim 1, wherein the participant is selected from the group consisting of: insurance carriers, insurance agencies, insurance agents, and service providers.

3. The method of claim 1, wherein the participant is selected from the group consisting of: agents and case managers.

4. The method of claim 1, wherein the desktop visual metaphor associated with the selected web-based application includes at least one selectable icon operable to activate at least one corresponding business module.

5. The method of claim 1, wherein the plurality of business modules are adapted to allow the plurality of web-based applications to be scalable.

6. The method of claim 1, wherein each of the plurality of web-based applications comprises:

a participant profile module for managing profiles of participants of the web-based application;

a general administration module for handling administrative tasks pertaining to the web-based application; and a business module for accomplishing tasks related to insurance underwriting or management.

7. The method of claim 1, wherein the plurality of business logic tools of each of the plurality of business modules of each of the plurality of web-based applications comprises at least one generic tool and at least one entity-specific tool.

8. The method of claim 7, wherein the at least one generic tool is adapted to operate in more than one module with similar functionality.

9. The method of claim 1, wherein the plurality of views comprises:

a summary view;
a list view; and
a detail view.

10. The method of claim 1, wherein the web-based portal is adapted to allow development of new applications, modules, tools, or views.

11. The method of claim 1, wherein the step of sharing the data further comprises encrypting the data using a secure encryption technology.

12. The method of claim 1, wherein said providing includes deploying the web-based portal on a computer system hosted by a third party.

13. The method of claim 1, wherein the web-based portal is deployed on a framework for a plurality of applications.

14. A system for facilitating communication among a plurality of participants in an insurance-underwriting process, the system comprising:

one or more database server computer systems configured to provide a central data repository for storing and organizing data related to the insurance-underwriting process;

one or more application server computer system configured to provide a plurality of web-based applications hosted by the one or more application server computer systems, each of the plurality of web-based applications employing a consistent desktop visual metaphor having at least a business module menu portion, an active business module tool portion, and a toolbar; and one or more web-server computer systems configured to provide a web-based portal to the participants in the insurance-underwriting process, the web-based portal providing each participant access to one or more of the plurality of web-based applications based on one or more attributes associated with the participant;

wherein the one or more web server computer systems are further configured to generate information configured for displaying the desktop visual metaphor associated with a selected web-based application in the plurality of web-based applications to a participant accessing the web-based portal from a client device based on one or more attributes associated with the participant, the desktop visual metaphor associated with the selected web-based application including:

a toolbar configured with one or more visual representations for each of one or more of a plurality of business modules associated with the selected web-based application that are accessible to the participant based on the one or more attributes associated with the participant, each of the plurality of business modules having a plurality of business logic tools, a business module menu portion configured with one or more menu items for each of one or more of the plurality of business logic tools associated with a selected business module in the plurality of business modules that are accessible to the participant based on the one or more attributes associated with the participant, each of the plurality of business logic tools having a plurality of views configured for displaying data stored in the central data repository, and an active business module tool portion configured with one or more of the plurality of views associated with an active business module tool in the plurality of business module tools that is accessible to the participant based on the one or more attributes associated with the participant;

wherein the plurality of participants comprises the participant, the participant being associated with at least one role, the at least one role being operative to determine the web-based applications, business plurality of modules, and business logic tools available to the participant and the data available to the participant, and wherein the one or more server computer systems are adapted to restrict the business modules and data accessible to the at least one user based on said role.

15. The system of claim 14, wherein the participant is selected from the group consisting of: insurance carriers, insurance agencies, insurance agents, and service providers.

16. The system of claim 14, wherein the participant is selected from the group consisting of: agents and case managers.

17. The system of claim 14, wherein the desktop visual metaphor associated with the selected web-based application includes at least one selectable icon operable to activate at least one corresponding business module.

18. The system of claim 14, wherein the plurality of business modules are adapted to allow the plurality of web-based applications to be scalable.

19. The system of claim 14, wherein each of the plurality of web-based applications comprises:
 a participant profile module for managing profiles of participants of the web-based application;
 a general administration module for handling administrative tasks pertaining to the web-based application; and
 a business module for accomplishing tasks related to insurance underwriting or management.

20. The system of claim 14, wherein the plurality of business logic tools of each of the plurality of business modules of each of the plurality of web-based applications comprises at least one generic tool and at least one entity-specific tool.

21. The system of claim 20, wherein the at least one generic tool is adapted to exist in more than one module with similar functionality.

22. The system of claim 14, wherein the plurality of views comprises:
 a summary view;
 a list view; and
 a detail view.

23. The system of claim 14, wherein the web-based portal is adapted to allow development of new applications, modules, tools, or views.

24. The system of claim 14, wherein the data is encrypted using a secure encryption technology.

25. The system of claim 14, wherein the web-based portal is deployed on a portal hosted by a third party.

26. The system of claim 14, wherein the web-based portal system is deployed on a framework for a plurality of applications.

27. A non-transitory computer-readable medium storing computer-executable instructions for facilitating communication between at least two participants; in an insurance-underwriting process, the computer-readable medium comprising:
 instructions for providing a plurality of participants access to a central data repository via a web-based system for storing and organizing data related to the insurance-underwriting process;
 instructions for storing and organizing data related to the insurance-underwriting process in the central data repository;
 instructions for enabling collaboration among at least two participants of said participants from the plurality of participants via the Internet using the web-based system,
 the web-based system comprising a web-based portal providing each participant access to one or more of a plurality of web-based applications hosted by one or more application server computer systems based on one or more attributes associated with the participant, each of the plurality of web-based applications employing a consistent desktop visual metaphor having at least a business module menu portion, an active business module tool portion, and a toolbar;
 instructions for sharing, via the web-based system, at least a portion of said data among the plurality of participants,
 instructions for generating information configured for displaying the desktop visual metaphor associated with a selected web-based application in the plurality of web-based applications to a participant accessing the web-based portal from a client device based on a role associated with the participant, the desktop visual metaphor associated with the selected web-based application including:
  a toolbar configured with one or more visual representations for each of one or more of a plurality of business modules associated with the selected web-based application that are accessible to the participant based on the role associated with the participant, each of the plurality of business modules having a plurality of business logic tools,
  a business module menu portion configured with one or more menu items for each of one or more of the plurality of business logic tools associated with a selected business module in the plurality of business modules that are accessible to the participant based on the role associated with the participant, each of the plurality of business logic tools having a plurality of views configured for displaying data stored in the central data repository, and
  an active business module tool portion configured with one or more of the plurality of views associated with an active business module tool in the plurality of business module tools that is accessible to the participant based on the role associated with the participant; and
 instructions for restricting at least one of said plurality of business logic tools and a portion of said data accessible to the participant.

28. The computer-readable medium of claim 27, wherein each of the plurality of web-based applications comprises:
 a participant profile module for managing profiles of participants of the web-based application;
 a general administration module for handling administrative tasks pertaining to the web-based application; and
 a business module for accomplishing tasks related to insurance underwriting or management.

29. The computer-readable medium of claim 27, wherein the plurality of business logic tools of each of the plurality of business modules of each of the plurality of web-based applications comprises at least one generic tool and at least one entity-specific tool.

30. The computer-readable medium of claim 27, further comprising instructions for restricting business modules accessible to the participant.

31. The computer-readable medium of claim 27, wherein said instructions for providing access to said web-based system include instructions for providing said desktop visual metaphor including at least one selectable icon operable to activate at least one corresponding business module.

* * * * *

UNITED STATES PATENT AND TRADEMARK OFFICE
CERTIFICATE OF CORRECTION

| | | |
|---|---|---|
| PATENT NO. | : 8,463,624 B2 | Page 1 of 1 |
| APPLICATION NO. | : 10/669882 | |
| DATED | : June 11, 2013 | |
| INVENTOR(S) | : Hashim | |

It is certified that error appears in the above-identified patent and that said Letters Patent is hereby corrected as shown below:

On Title Page, column 2, item (56), under other publications, line 1, delete "Zebulnc." and insert -- Zebuinc. --, therefor.

In the Drawings:

On Sheet 4 of 23, in figure 6, reference Numeral 604b, line 1, Above "DB" insert -- GA --.

In the Specifications:

In column 7, line 29, after "that" delete "that".

In column 7, line 38-39, after "that" delete "that".

In column 8, line 17, after "These" delete "the".

In column 12, line 65, after "each" delete "of Each".

In the Claims:

In column 23, line 51, in Claim 26, after "portal" delete "system".

Signed and Sealed this
Twenty-ninth Day of October, 2013

Teresa Stanek Rea
*Deputy Director of the United States Patent and Trademark Office*